United States Patent [19]
Yasuno

[11] Patent Number: 5,344,224
[45] Date of Patent: Sep. 6, 1994

[54] SYSTEM AND METHOD FOR CONTROLLING BRAKING FORCE FOR AUTOMOTIVE VEHICLE

[75] Inventor: Yoshiki Yasuno, Yokohama, Japan

[73] Assignee: Nissan Motor Co., Ltd., Yokohama, Japan

[21] Appl. No.: 917,180

[22] Filed: Jul. 22, 1992

[30] Foreign Application Priority Data

Jul. 22, 1991 [JP] Japan .................. 3-181110

[51] Int. Cl.$^5$ .................. B60T 8/06; B60G 17/00
[52] U.S. Cl. .................. 303/111; 303/100
[58] Field of Search .......... 303/100, 97, 111, 106, 303/107; 384/426.02

[56] References Cited

U.S. PATENT DOCUMENTS

| | | | |
|---|---|---|---|
| 4,475,159 | 10/1984 | Gerstenmaier et al. | 303/97 |
| 4,895,416 | 1/1990 | Tozu et al. | 303/116.1 |
| 4,929,035 | 5/1990 | Shimanuki | 303/106 |
| 4,998,593 | 12/1991 | Karnopp et al. | 303/100 |
| 5,015,041 | 5/1991 | Kuwana et al. | 303/111 |
| 5,089,967 | 2/1992 | Haseda et al. | 303/100 |

FOREIGN PATENT DOCUMENTS 59-155264 10/1984 Japan .
2-219367 12/1991 Japan .

*Primary Examiner*—Matthew C. Graham
*Attorney, Agent, or Firm*—Foley & Lardner

[57] ABSTRACT

A system and method for independently controlling the braking force applied to each wheel of an automobile based on the lesser of two target braking force calculations intended to produce a desired vehicular motion. The first target braking force is based upon steering angle and vehicle sped, and is calculated so as to achieve a target value of a preselected motion variable, such as yaw rate, corresponding to the desired vehicular motion. The second target braking force is based upon individual wheel speed and is intended to maintain within a predetermined slip rate at least one wheel of the vehicle.

15 Claims, 9 Drawing Sheets

SYSTEM AND METHOD FOR CONTROLLING BRAKING FORCE FOR AUTOMOTIVE VEHICLE

BACKGROUND OF THE INVENTION

1. Field of the Invention

The present invention relates generally to a system and method for controlling a braking force for an automotive vehicle which can improve a steering stability of the vehicle during a braking.

2. Description of the Background Art

A previously proposed braking force controlling system is exemplified by a Japanese Utility Model Registration Application No. Showa-59 155264.

In the disclosed braking force controlling system, a difference in pressure of braking between right and left tire wheels is used to control a vehicular yaw characteristic. Specifically, when the braking is applied, a steering angle of a vehicular driver exceeding a predetermined value, a timing at which the braking pressure for each of outer tire wheels with respect to a cornering force is increased is delayed so as to improve a cornering characteristic of the vehicle during the braking.

However, since, the previously proposed braking force controlling system does not take into consideration of the fact that a yaw rate generated due to a front wheel steering and a braking force difference between those at the right and left tire wheels is dependent upon a vehicle speed, it is difficult to control the yaw rate toward an appropriate value and it is difficult to improve a transient characteristic of the generated yaw rate.

A Japanese Patent Application No. Heisei-2 219867 (First Publication No. Heisei-3 281467 published on Dec. 12, 1991) exemplifies another driving force controlling system in which a target yaw rate is set on the basis of the vehicle speed and steering angle, a target right and left braking force difference required to make the target yaw rate coincide with an actually generated yaw rate is calculated on the basis of a vehicular model set according to the vehicular requirements and motion equations, and such a control that left and right tire wheel braking forces calculated according to the target left and right driving force difference coincides with actual left and right tire wheel braking forces.

Therefore, the transient characteristic of the yaw rate generated depending upon the vehicle speed can be improved. It is noted that the target left and right braking force difference is calculated using a cornering power of the vehicle tire wheels in the vehicular model.

However, since in the other braking force controlling system the increase in the braking pressure for one tire wheels is carried out and the decrease in the braking pressure for the other tire wheels is also carried out and a function of, so-called, anti-skid control so as to prevent the tire wheels from being locked is not provided.

Hence, in a case where the vehicle running on a road surface having a low motion friction coefficient (or slippery road surface) applies a braking and/or an abrupt (or full) braking, the tire wheels are locked so that the cornering force generated on the tire wheels becomes zero. Consequently, a large deviation occurs between the cornering power of the vehicular model and actually generated cornering power of the vehicle so that a controllability of the braking forces becomes reduced.

SUMMARY OF THE INVENTION

It is, therefore, a principal object of the present invention to provide a system and method for controlling a braking force for an automotive vehicle in which a function of, so-called, anti-skid control is added to a braking force control function so as to achieve a higher steering stability of the vehicle.

The above-described object can be achieved by providing a system for controlling a braking force applied to each tire wheel of an automotive vehicle, comprising: a) first means for detecting a steering angular displacement of a steering wheel of the vehicle and for producing a first signal indicative of the steering angular displacement; b) second means for detecting a forward-/rearward speed of the vehicle and for producing a second signal indicative of the speed; c) third means, responsive to the first and second signals from the first and second means, for setting a target value of a vehicular motion; d) right and left braking means, disposed on at least one of front tire wheels or rear tire wheels; e) fourth means for calculating a first target braking force required to achieve the target value of the vehicular action in the vehicle which is an object to be controlled; f) fifth means for detecting a revolution speed of at least one of vehicular tire wheels on which said left and right braking means is disposed and for producing a third signal indicative of the revolution speed; g) sixth means for calculating a second target braking force of the braking means required for a slip on the tire wheel related to the fifth means to fall in a predetermined condition; and h) seventh means for independently controlling the braking force derived from said left and right braking means for each tire wheel so as to become coincident with either less one of the first target braking force or second target braking force as a final target braking force.

The above-described object can also be achieved by providing a method for controlling a braking force applied to each tire wheel of an automotive vehicle, comprising the steps of: a) detecting a steering angular displacement of a steering wheel of the vehicle and producing a first signal indicative of the steering angular displacement; b) detecting a forward/rearward direction speed of the vehicle and producing a second signal indicative of the speed; c) responsive to the first and second signals derived in the steps a) and b), setting a target value of a vehicular motion; d) calculating a first target braking force required to achieve the target value of the vehicular action in the vehicle which is an object to be controlled; e) detecting a revolution speed of at least one of vehicular tire wheels on which left and right braking means are disposed and producing a third signal indicative of the revolution speed; f) calculating a second target braking force of the braking means required for a slip on the tire wheel related to the step e) to fall in a predetermined condition; and g) independently controlling the braking force derived from said left and right braking means for each tire wheel so as to become coincident with either less one of the first target braking force or second target braking force as a final target braking force.

DESCRIPTION OF THE PREFERRED EMBODIMENT

Reference will hereinafter be made to the drawings in order to facilitate a better understanding of the present invention.

Figure 1:
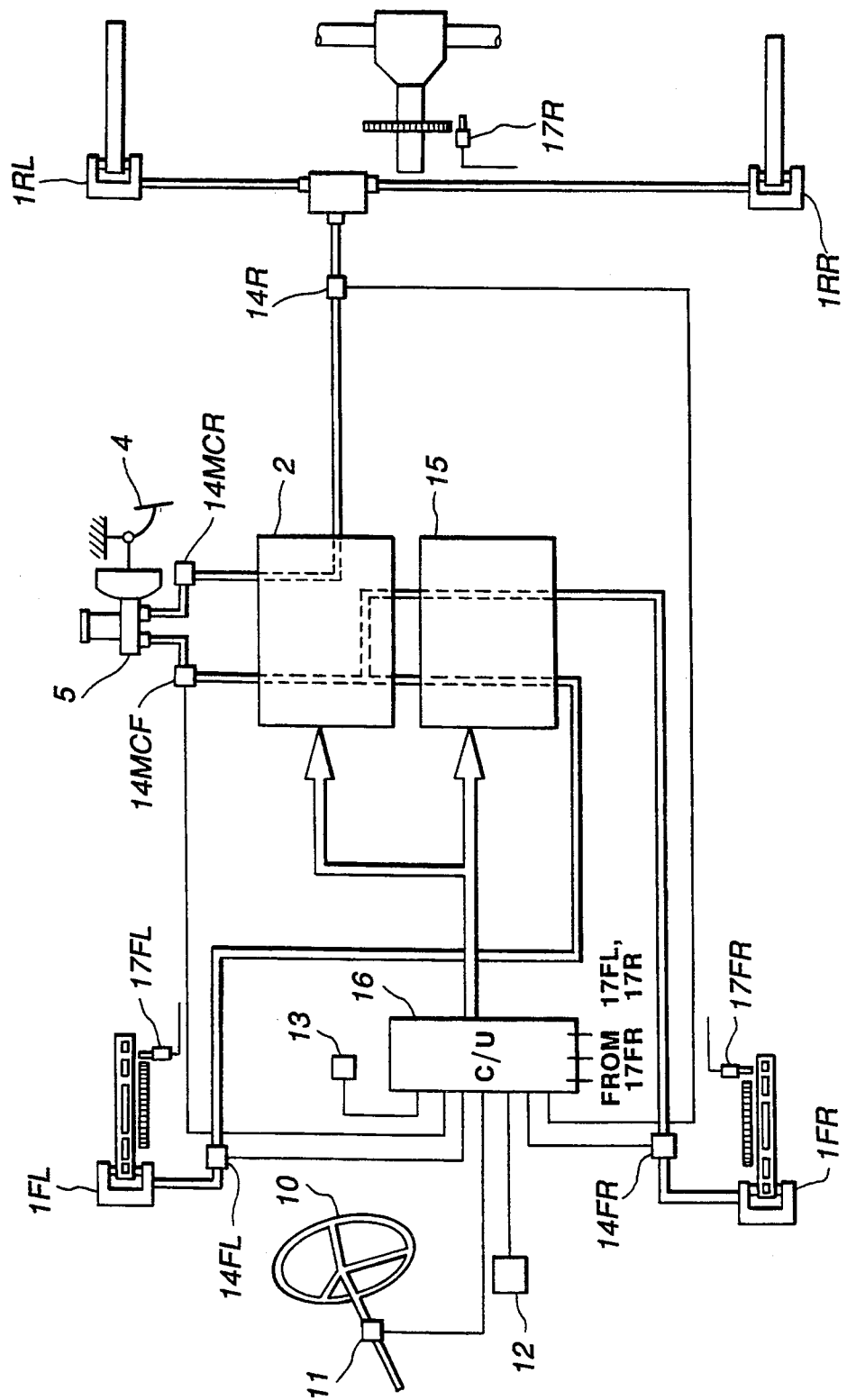
FIG. 1 is a schematic wiring and hydraulic system diagram of a preferred embodiment of a braking force controlling system according to the present invention.

FIG. 1 shows a hydraulic and electric system configration of a preferred embodiment of a system for controlling a braking pressure according to the present invention.

In FIG. 1, reference numerals 1FL and 1FR denote wheel cylinders attached onto front tire wheels as right and left braking means. Reference numerals 1RL and 1RR denote wheel cylinders attached onto rear wheels as right and left braking means. A braking liquid pressure supplied to the wheel cylinders 1FL, 1FR at the front tire wheels is controlled by means of two actuators 2, 15 and the braking pressure supplied to the wheel cylinders 1RL, 1RR is controlled by means of only one actuator 2.

Figure 2:
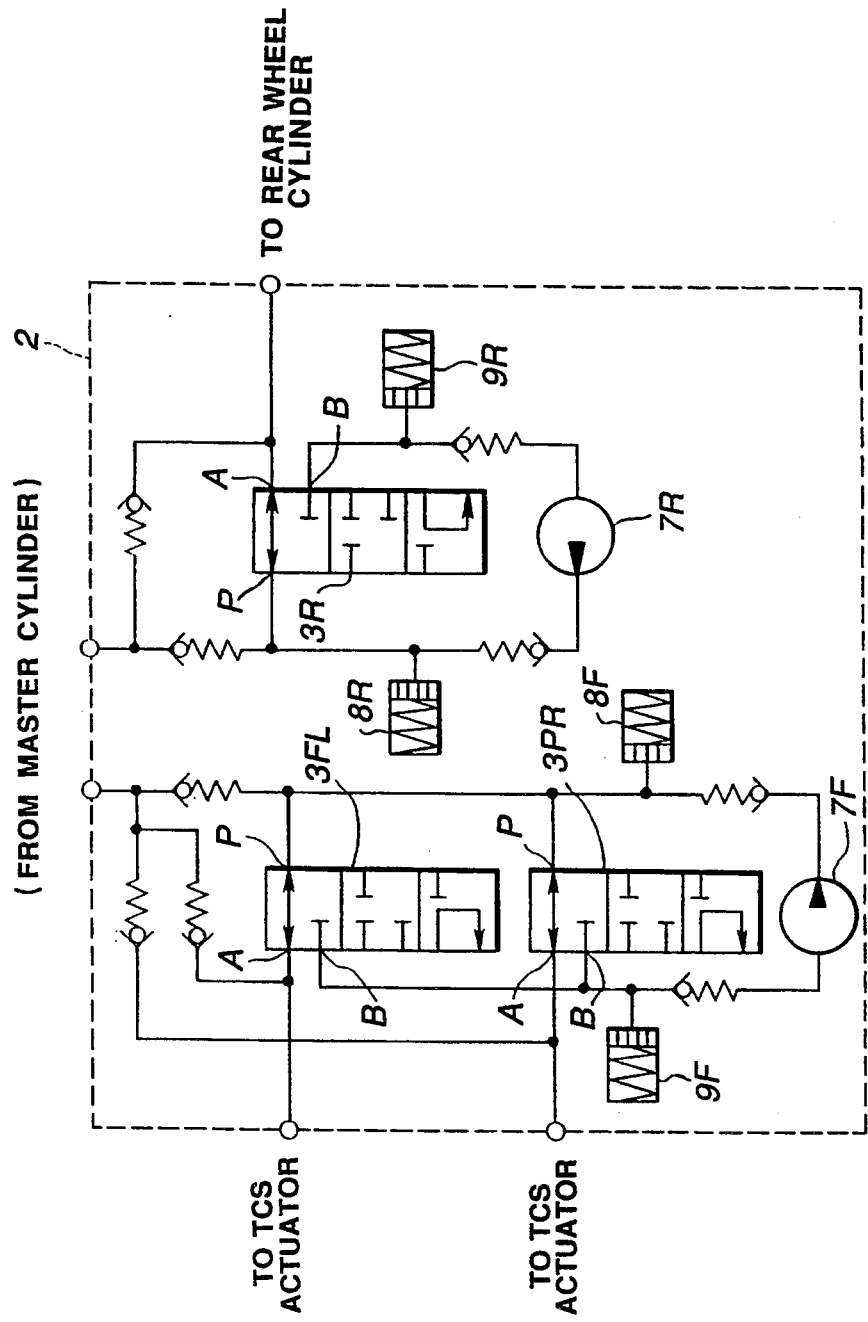
FIG. 2 is a hydraulic system configuration of one actuator shown In FIG. 1.

FIG. 2 shows a schematic view of the one actuator 2 described above.

As shown in FIG. 2, the one actuator 2 has the same structure as the conventional anti-skid control actuator. In details, the one actuator 2 includes: two 3-port, 3 position solenoid operated direction select valves 3FL and 3FR which individually control the front tire wheel cylinders 1FL, 1FR via the other actuator 15; and a 3-port, 3-position solenoid operated direction select valve 3R which simuntaneously controls the rear wheel cylinders 1RL, 1RR.

These solenoid operated directional select valves 3FL, 3FR, 3R serve to control the braking liquid pressure at the wheel cylinders 1FL, 1FR, 1RL, 1RR (1R) so as to be reduced below the braking liquid pressure of the master cylinder 5.

In addition, the P ports of the solenoid operated direction select valves 3FL and 3FR are connected to one system of two hydraulic systems of a master cylinder 5 linked to a brake pedal 4. Ports A of the solenoid operated direction select valves 3FL, 3FR are connected to the other actuator 15. Furthermore, ports B thereof are connected to one system of the master cylinder 5 via a hydraulic pump 7F driven by means of an electric motor (not shown).

In addition, the P port of the solenoid operated direction select valve 3R is connected to the other systems of the two hydraulic system master cylinder 5. The A port thereof 3R is connected to the wheel cylinders 1RL and 1RR. The B port thereof is connected to the other system of the master cylinder 5 via another hydraulic pump 7R driven by means of an electric motor (not shown).

Furthermore, an accumulator 8F is connected to a conduit extended between the P port of the solenoid operated direction select valves 3FL and 3FR and hydraulic pump 7F. A reservoir tank 9R is connected to a conduit extended between the B port and hydraulic pump 7R.

It is noted that the respective front tire wheel side solenoid operated directional select valves 3FL, 3FR serve to increase the braking liquid pressure of the master cylinder 5 upto the braking liquid pressure of the master cylinder, with both master cylinder 5 and the other actuator 15 directly connected to the other actuator 15 at a first switching position of a normal position as shown in FIG. 2, and holds the braking liquid pressure, with the connection between the other actuator 15, master cylinder 5, and hydraulic pressure pump 7F being interrupted. Furthermore, since the other actuator 15 and the master cylinder 5 are connected via the hydraulic pressure pump 7F at the third switching position so that the braking pressure is returned to the master cylinder 5. These switching positions are switched and controlled according to three stages of current values to be supplied from the braking pressure controlling system 16 as will be described later.

In addition, the rear wheel solenoid operated direction select valve 3R is directly connected with the master cylinder 5 and wheel cylinders 1RL, 1RR at the first switching position of the normal position.

At the second switching position, the wheel cylinders 1RL, 1RR, master cylinder 5, and hydraulic pressure pump 7R are interrupted at the second switching position so that the braking liquid pressure of the wheel cylinders 1RL, 1RR is held at the present value.

Furthermore, at the third switching position, both the wheel cylinders 1RL, 1RR and master cylinder 5 and the master cylinder 5 are connected via the hydraulic pump 7R. The braking liqiud in the wheel cylinders 1RL, 1RR is in the pressure decrease condition such as to be returned to the master cylinder side 5. These switching postions are controlled by means of three stages of current values supplied to the braking pressure controlling system 16.

Figure 3:
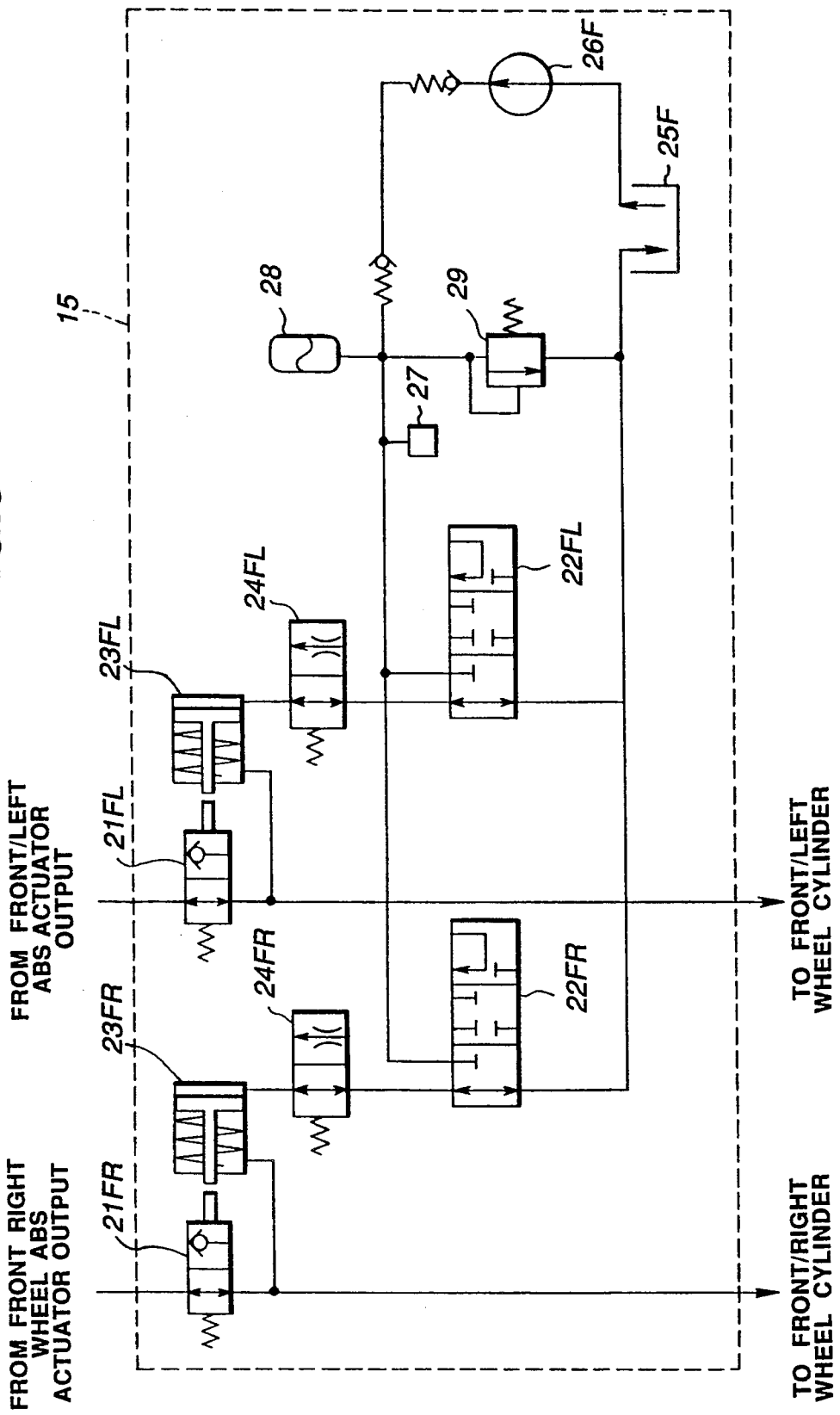
FIG. 3 is a hydraulic system configuration of the other actuator shown in FIG. 1.

In addition, the other actuator 15 has the same structure as the conventional traction controlling actuator as shown in FIG. 3. The braking liqiud pressure from the one actuator 2 is input to the front-wheel wheel cylinders 1FL, 1FR and the three port three position electromagnetic direction select valves 22FL, 22FR serve to control individually upto the braking liquid pressure of the master cylinder 3.

The A port of the electromagnetic (solenoid operated) direction select valves 22FL, 22FR is connected to the conduit connecting the solenoid operated direction select valves 21FL, 21FR and wheel cylinders 1FL, 1FR.

At an intermediate position of the conduit between select valves 21FL, 21FR and wheel cylinders 1FL, 1FR, both plunger type pistons 23FL, 23FR and throttle valves 24FL. 24FR which serve to change the direction select valves 21FL, 21FR are interposed. In addition, the B ports of the solenoid operated direction select valves 22FL, 22FR are connected to the hydraulic pump 26F which incrases the braking liquid of the braking liqiud of the braking liquid reservoir tank 25F. Furthermore, the P port is connected to the reservoir tank 25F.

A pressure switch 27 is disposed in the conduit between the hydraulic pump 26F and 3-port 3-position solenoid operated direction select valves 22FL, 22FR. An accumulator 28 is connected to the conduit connected to the pressure switch 27. The accumulator 28 serves to deposit the braking liquid pressurized by means of the hydraulic pump 27.

Furthermore, the accumulator 28 is connected to the reservior 25F via a relief valve 29. A signal derived from the presssure switch 27 is input to the braking pressure controlling unit 16 as will be described below.

When the braking pressure is below a first threshold value Po, a hydraulic pump drive signal output from the braking pressure controlling unit 16 is used to drive the hydraulic pump 26F. When the braking liquid pressure is above a second threshold value $P_1$ ($>P_o$), a drive signal is halted on the basis of the signal derived from the switch 27.

Furthermore, if the braking liquid pressure is above a third threshold value $P_2$ ($>P^1$), a relief valve 29 is driven so that the braking liquid in the accumulator 28 is relieved by the reservior tank 25f.

On the other hand, the respective solenoid operated direction select valves 22FL, 22FR are communicated with the plunger type pistons 23FL, 23FR at the third switching position as shown in FIG. 3 and with the accumulator 28 so as to forward the pistons 23FL, 23FR. Then, rods of the same pistons 23FL, 23FR serve to switch the mechanically operated select valves 21FL, 21FR so that the output to the one actuator 2 is interrupted. Simultaneously, the braking liquid in the pistons 23FL, 23FR is pressurized and supplied to the wheel cylinders 1FL, 1FR so that the braking liquid pressure in the wheel cylinders 5 are increased upto the braking liquid pressure level in the master cylinder 5.

In addition, the connection of the plunger type pistons 23FL, 23FR and accumulator 28 is interrupted at the second switching position and they stop at their current positions so that the braking liquid pressure in the wheel cylinders 1FL, 1FR is held.

On the other hand, at the normal first switching position, both plunger type pistons 23FL, 23FR and reservoir tank 25F are communicated and relieved. The rods of the pistons 23FL, 23FR are retracted and wheel cylinders 1FL, 1FR are decreased in pressure. Simultaneously, the switching valves 21FL, 21FR are returned to a steady-state position so that the braking liquid pressure is input to the wheel cylinders 1FL, 1FR.

It is noted that a check valve is used at the switching position of the plunger type pistons 23FL, 23FR so that rods of the pistons 23FL, 23FR are automatically forwarded/reversed.

In addition, throttle valves 24FL, 24FR are switched in a pressure increase state of a throttled state so that the plunger type pistons 23FL, 23FR are slowly forwarded.

On the other hand, a steering angle sensor 11 is disposed for detecting a steering angle of the steering wheel 10 such that the steering angle sensor 11 outputs a zero voltage signal when the steering wheel 10 is placed at a neutral position, a negative voltage signal representing the angle $-\theta$ according to the steering angle when the steering angle is turned right with respect to the neutral position, and a positive voltage signal representing $+\theta$ according to the steering angle when the steering angle is turned left with respect to thereof.

A vehicle speed sensor 12 is disposed for outputting a vehicle speed detected value $V_x$ according to the vehicle speed. A brake switch 13 is attached which detects a depression state of a brake pedal 4. Pressure responsive sensors 14FL, 14FR, 14R output pressure detection values $P_{FL}$, $P_{FR}$, and $P_R$ according to cylinder pressures in the respective wheel cylinders 1FL, 1FR, 1RL. Pressure switches 14MCF. 14MCR which output the pressure detection values $P_{MCF}$ and $P_{MCR}$ according to the respective system cylinder pressures of the two-system master cylinder 5. Vehicle tire wheel speed sensors 17FL, 17FR, 17R output the tire wheel speed detection values $V_{WFL}$, $V_{WFR}$, $V_{WR}$, respectively, according to the left front tire wheel speed and rear tire wheel speed. Each detection value of the sensors are input to the braking pressure controlling unit 16.

It is noted that the tire wheel speed sensors 17FL, 17FR, 17R output alternating current waves according to the corresponding tire wheel speed and are converted again into the tire wheel speed detection values.

Figure 4:
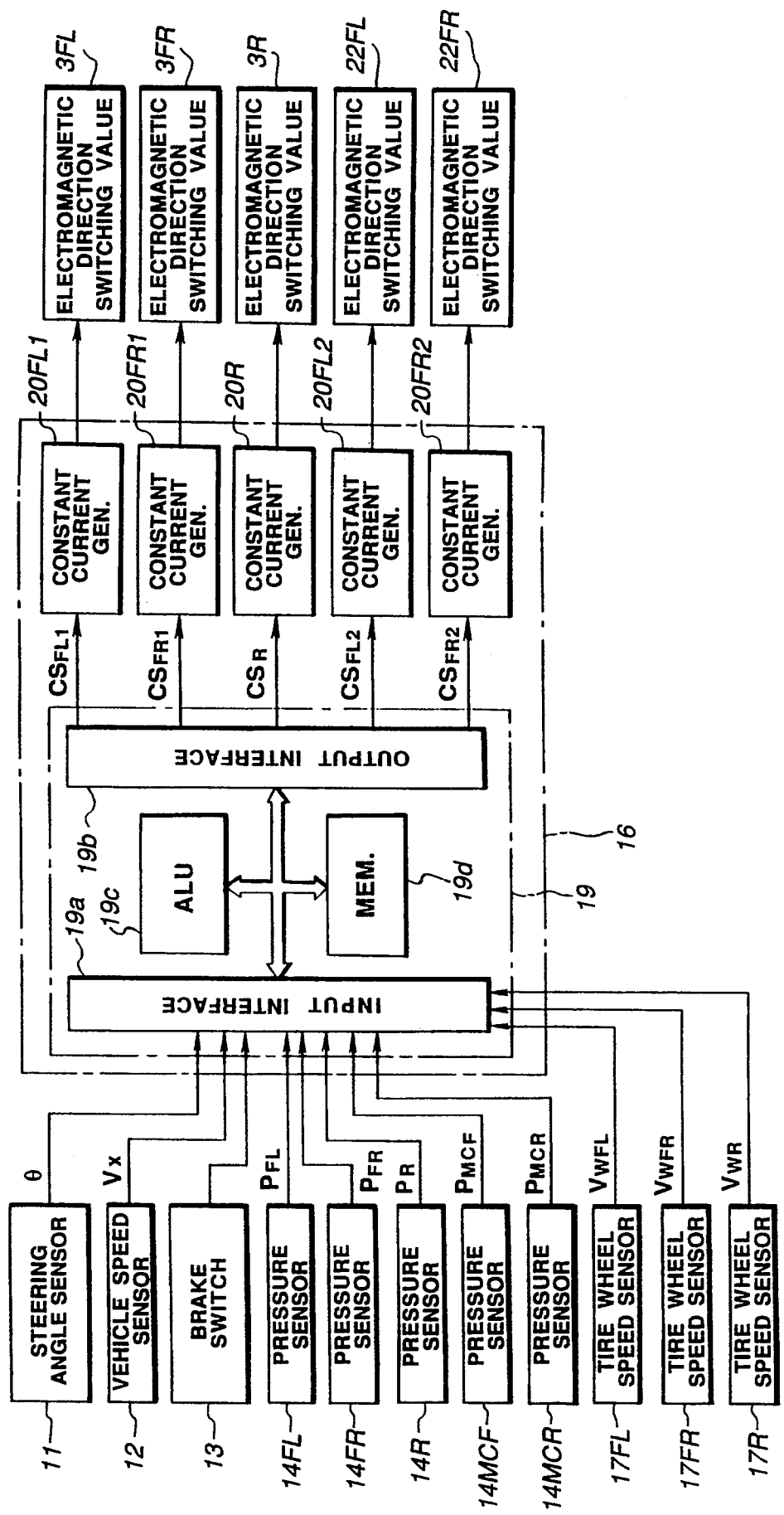
FIG. 4 is a block diagram of an example of a braking force controlling unit shown in FIG. 1.

The braking pressure controlling unit 16, as shown in FIG. 4, includes: a microcomputer 19 which inputs each detection value of the respective sensors 11, 12, 13, 14FL~14MCF, 14MCR, 17FL~17R; floating type constant current supply circuits 20FL1, 20FRI0, and 20R which, responsive to the respective inputs of control signals $CS_{FL1}$, $CS_{FR1}$, and $CS_R$ output from the microcomputer 19, drive solenoids in the solenoid operated direction select valves 3FL, 3FR, and 3R of the one actuator 2; and floating type constant current circuits 20FL2, 20FR2 which, responsive to the respective inputs of control signals $CS_{FL2}$ and $CS_{FR2}$ output from the microcomputer 19, drives the solenoids of the solenoid operated direction select valves 22FL, 22FR of the other actuator 15.

The microcomputer 19 includes: an input interface 19a having at least A/D conversion function; an output interface 19b having at least D/A conversion function; an arithmetic and logic operation unit (hereinafter, also referred to as a CPU (Central Processing Unit) 19c; and a storage unit (memory) 19d.

Figure 6:
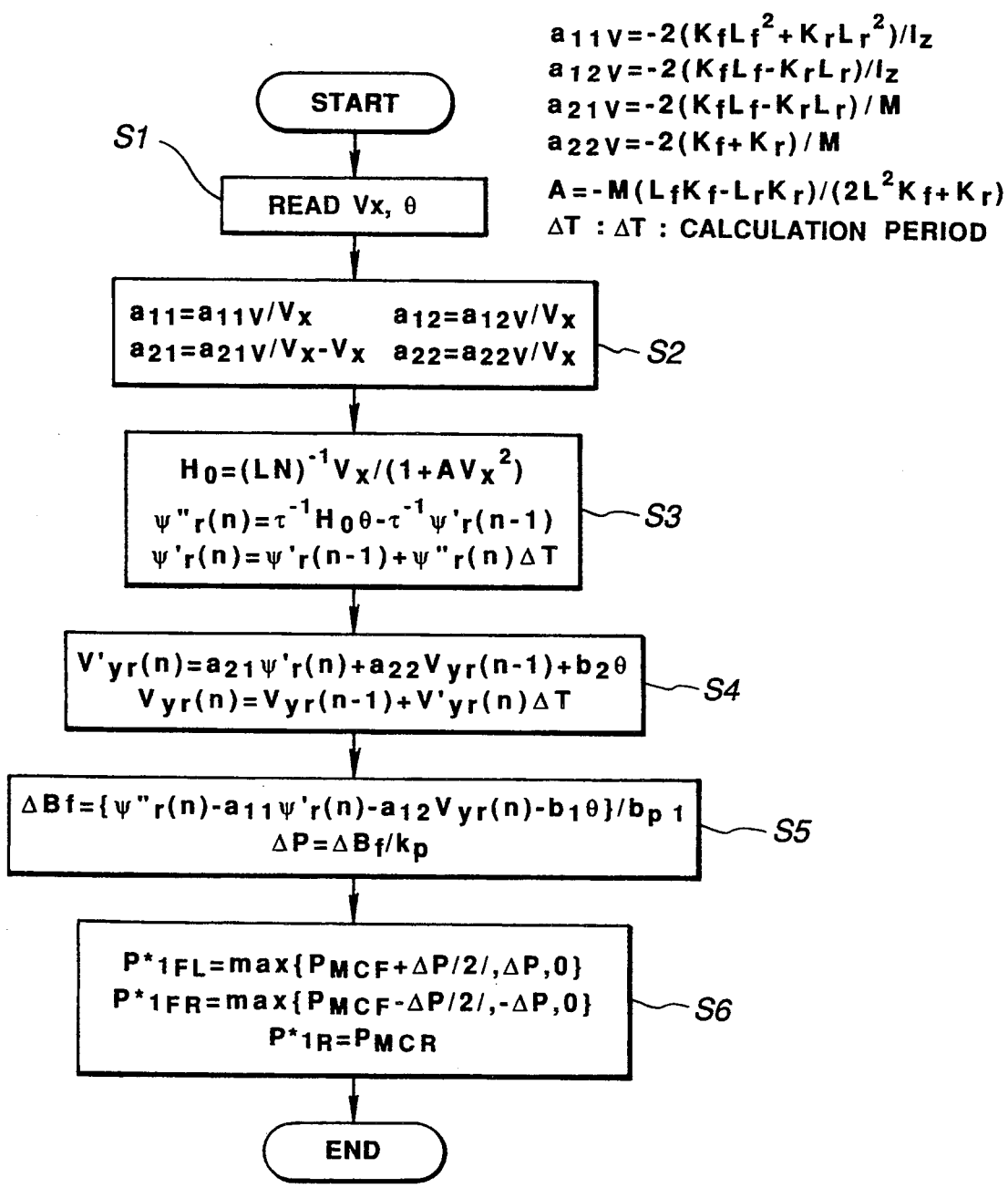
FIG. 6 is an operational flowchart of an example of processing a first target braking force calculation in the braking pressure controlling system.

The arithmetic and logic operation unit 19c executes a processing routine shown in FIG. 6 on the basis of the steering angle detection value $\theta$ from the steering angle sensor 11, the vehicle speed $V_x$ detection value from the vehicle speed sensor 12, master cylinder pressure detection values $P_{MCF}$, $P_{MCR}$ from the pressure sensors 14MCF, 14MCR to calculate first target wheel cylinder pressures $P^*_{1FR}$, $P^*_{1FL}$, and $P^*_{1R}$ as the right and left front wheels and rear tire wheels, respectively. In addition, the arithmetic and logic operation unit 19c calculates second target wheel cylinder pressures $P^*_{2FR}$, $P^*_{2FL}$, and $P^*_{2R}$ as second target braking forces at the right and left front tire wheels when executing a processing routine shown in FIG. 7 on the basis of vehicle speed detection value $V_x$, tire wheel speed values $V_{WFR}$, $V_{WFL}$, and $V_{WR}$, and the first target wheel cylinder pressures $P^*_{1FR}$, $P^*_{1FL}$, and $P^*_{1R}$ so that either of the corresponding first target wheel cylinder pressures $P^*_{FR}$, $P^*_{FL}$, and $P^*_{2R}$ or the second target wheel cylinder pressures $P^*_{2FR}$, $P^*_{2FL}$ and $P^*_{2R}$ which have lower values tha the others, Then, the arithmetic and logic operation unit 19c executes the processing routines shown in FIGS. 8 and 9 on the basis of the final target wheel cylinder pressures $P^*_{FR}$, $P^*_{FL}$, and $P^*_R$ and cylinder pressure detection values $P_{FR}$, $P_{FL}$, $P_R$, $P_{MCF}$, and $P_{MCR}$ of the pressure responsive sensors 14FR, 14FL, 14R, 14MCF, and 14MCR.

On the other hand, the control signals $CS_{FL1}$ and $CS_{FR1}$ which are used to control the solenoid operated direction select valves 3FL, 3FR of the one actuator 2. To the solenoid operated direction select valve 3R, the control signal $CS_R$ is output.

Next, a series of operations in the preferred embodiment of the braking pressure controlling system will be described below.

First, the calculations of the yaw rate and lateral direction motion values as the vehicular motion target values will be desribed in the preferred embodiment.

Figure 5:
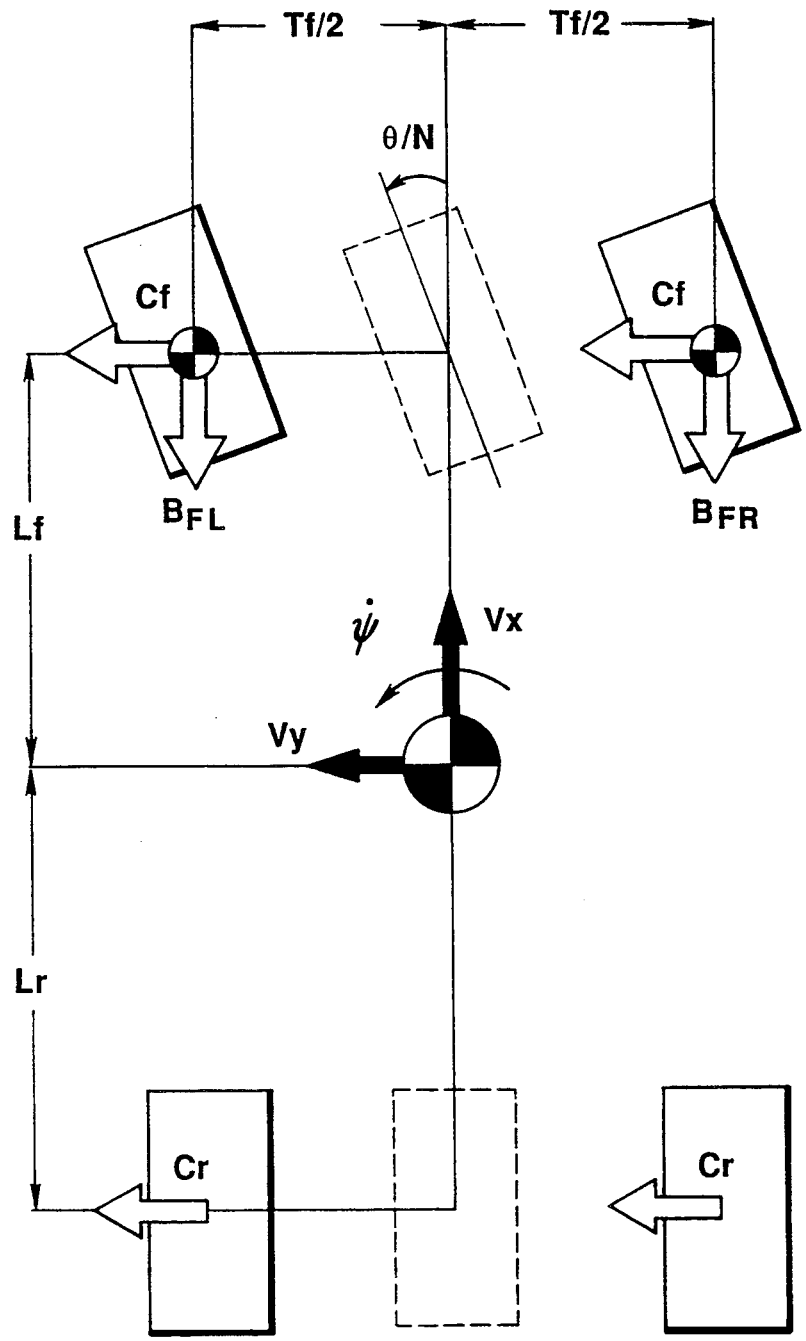
FIG. 5 is an explanatory view for explaining a motion mathematical model of a vehicle.

Supposing that the vehicular motion is considered as two degrees of freedoms of the yawing and lateral direction, as shown in FIG. 5, the motion equtions can be expressed as in the following two euqations:

$$Iz \cdot \psi''(t) = C_f L_f - C_r L_r + T_f (B_{FL}(t) - B_{FR}(t))/2 \quad (1)$$

$$M \cdot V_y(t) = 2(C_f + C_r) - M \cdot V_x(t) \cdot \psi'(t) \quad (2)$$

, wherein $I_z$ denotes a vehicular yaw inertia moment, $\psi'(t)$ denotes the yaw rate, $L_f$ denotes a distance from a vehicular center of gravity to a front tire wheel axle. $L_r$ denotes a distance between the vehicular weight center and rear vehicle axle, $T_r$ denotes a front wheel tread, $B_{FL}(t)$ denotes a left front tire wheel braking force. $B_{FR}(t)$ denotes a right front tire wheel braking force. M denotes a vehicular weight, $V_y(t)$ denotes a vehicular lateral direction velocity, and $V_x(t)$ denotes a vehicular front-and-rear velocity (forward/rearward speed).

In addition, $C_f$ and $C_r$ denotes cornering forces of the front and rear tire wheels and can be expressed in the following (3) and (4) equations.

$$C_f = K_f \{\theta(t)/N - (V_y + L_f \cdot \psi'(t)/V_x(t)\} \quad (3)$$

$$C_r = -K_r (V_y - L_r \psi'(t))/V_x(t) \quad (4)$$

It is noted that $\theta(t)$ denotes a steering angle, N denotes a steering gear ratio, $K_f$ denotes a front wheel cornering power, and $K_r$ denotes a rear tire wheel cornering power.

Substituting the equations (3) and (4) into the equations (1) and (2) to consider differential equations related to the yaw rate $\psi'(t)$ and lateral direction velocity $V_y(t)$, they can be expressed in the following five and six equations.

$$\psi''(t) = a_{11} \cdot \psi'(t) + a_{12} \cdot V_y(t) + b_1 \cdot \theta(t) + b_{Pt} \cdot \Delta B_f(t) \quad (5)$$

$$V'_y(t) = a_{21} \cdot \psi'(t) + a_{22} \cdot V_y(t) + b_2 \cdot \theta(t) \quad (6)$$

, wherein $$\Delta B_f(t) = B_{fL}(t) - B_{FR} \quad (7.1)$$

$$a_{11} = -2(K_f \cdot L_f^2 + K_r L_r^2)/(I_z \cdot V_x) \quad (7.2)$$

$$a_{12} = -2(K_f L_f - K_r L_r)/I_z \cdot V_x \quad (7.3)$$

$$a_{21} = -2(K_f L_f - K_r L_r)/(M \cdot V_x) - V_x \quad (7.4)$$

$$a_{22} = -2(K_f + K_r)/M \cdot V_x \quad (7.5)$$

$$b_1 = 2 \cdot K_f L_r/(I_z \cdot N) \quad (7.6)$$

$$b_2 = 2 \cdot K_f/(M \cdot N) \quad (7.7)$$

$$b_{Pt} = T_f/(2 \cdot I_z) \quad (7.8)$$

Supposing that the normal vehicle is considered, the front tire wheel braking force difference $\Delta B_f(t)$ is zero. If the item of $\Delta B_f(t)$ in the equation (5) is neglected, a transfer function of the yaw rate $\psi'(t)$ with respect to the steering angle $\theta(t)$ is expressed in the following equation (8) using a differentiator S.

$$\psi'(s)/\theta(s) = [b_1 \cdot S \cdot (a_{12} \cdot b_2 - a_{22} \cdot b_1)]/S^2 - (a_{11} + a_{22})S + (a_{11} \cdot a_{22} - a_{12} \cdot a_{21}) \quad (8)$$

Similarly, the transfer function of the vehicular lateral velocity Vy(t) with respet to the steering angle $\theta(t)$ is expressed using the differentiator S in the following equation (9).

$$V_y(t)/\theta(s) = b_2 \cdot S + (a_{21} \cdot b_1 - a_{11} \cdot b_2)/S^2 - (a_{11} + a_{22})S + (a_{11} \cdot a_{22} - a_{12} \cdot a_{21}) \quad (9)$$

The transfer function of the equations (8) and (9) are in the form of (first order)/(second order). As the forward and rearward velocities $V_x$ become large, the generated yaw rate $\psi'(t)$ and vehicular lateral direction velocity Vy(t) are vibrative, the vehicular steering characteristic and stability become worsened. That is to say, a coefficient $\{-a_{11}+a_{22}\}$ related to a first order item of a denominator of the equations (8) and (9) corresponds to a damping factor $\zeta$ of the control system. Therefore, If $a_{11}$ and $a_{22}$ shown in the equations (7.2) and (7.5) are substituted into the coefficient $\{-(a_{11}+a_{22})\}$, these $a_{11}$ and $a_{22}$ normally indicate negative values. Thus, the damping coefficient $\zeta$ indicates a positive damping value. As the vehicle froward-and-rearward velocity Vx becomes becomes large, the damping coefficient $\zeta$ approaches to zero. In other words, as the vehicle forward and rearward velocity Vx becomes large, the damping coefficient $\zeta$ of the control system becomes small. Consequently, the yaw rate $\psi'(t)$ and vehicle lateral velocity Vy(t) become vibrative (difficult to damp or attenuate).

For example, suppose that the target yaw rate $\psi'r(t)$ is a first-order lag system without overshooting or undershooting with respect to the steering angle input $\theta(t)$. In addition, suppose that a steady-state value is equally set as the normal vehicle, the target yaw rate $\psi'r(t)$ can be expressed in the following equation (10).

$$\psi'r(t) = H_0 \cdot \theta(t)/(1+\tau t) \quad (10)$$

In the equation (10), $H_0$ denotes a steady-state yaw rate gain. If a stability factor A is used, the steady state yaw rate gain $H_0$ can be defined in the following equation (11).

$$H_0 = V_x/\{(1+A \cdot V_x^2) \cdot L \cdot N\} \quad (11)$$

In the equation (11), L denotes a wheel base and the stability factor A can be expressed in the following equation (12).

$$A = \frac{-M(Lr \cdot Kr - Lr \cdot Kr)}{2 \cdot L^2 \cdot Kf \cdot Kr} \quad (12)$$

Next, using the braking force difference $\Delta Bf(t)$ of the right and left front tire wheels, a method for calculating the first target braking force so as to make the vehicular generated yaw rate $\psi'(t)$ coincident with the target yaw rate $\psi'r(t)$ will be described below.

A differentiated value $\psi''r(t)$ of the target yaw rate can be derived by the following equation (13) which is derived from the equation (10).

$$\psi''r(t) = H_0 \cdot \theta(t)/\tau - \psi'r(t)/\tau \tag{13}$$

Supposing that the steering angle input $\theta(t)$ and the generated yaw rate $\psi'(t)$ caused by the right and left front tire wheel braking force difference $\Delta Bf(t)$ coincides with the target yaw rate $\psi'r(t)$, each differentiated value $\psi''(t)$ and $\psi''r(t)$ is also coincident with each other.

Hence, suppose that $\psi''r(t) = \psi''(t)$ and $\psi'r(t) = \psi'(t)$ and the lateral direction velocity Vy(t) when the above supposition is established is defined as a target lateral velocity Vyr(t).

If these are substituted into the equations (14) and (15), the following equations (14) and (15) can be derived.

$$\psi''r(t) = a_{11} \cdot \psi'r(t) + a_{12} \cdot Vyr(t) + b_1 \cdot \theta(t) + b_{pt} \cdot \Delta Bf(t) \tag{14}$$

$$Vyr'(t) = a_{21} \cdot \psi'r(t) + a_{22} \cdot Vyr(t) + b_2 \cdot \theta(t) \tag{15}$$

Then, if the equation (14) is substituted into the equation (15), the braking force difference $\Delta Bf(t)$ of the right and left front tire wheels can be derived from the following equation (18).

$$\Delta Bf(t) = (\psi''r(t) - a_{11} \cdot \psi'r(t) - a_{12} \cdot Vyr(t) - b_1 \cdot \theta(t))/b_{pt} \tag{16}$$

To generate the braking force difference $\Delta Bf(t)$ of the left and right front wheels derived from the equation (16), the difference pressure in the left and right front wheel cylinder pressures may be generated.

The relationship between the wheel cylinder pressure P and braking force Bf may be derived by the following equation (17) if the inertia moment of the tire wheel is neglected.

$$\begin{aligned} Bf &= 2 \cdot \mu_p \cdot A_p \cdot r_p \cdot P/R \tag{17} \\ &= k_p \cdot P \\ k_p &= 2 \cdot \mu_p \cdot A_p \cdot r_p/R \tag{18} \end{aligned}$$

, wherein $k_p$ denotes a proportional constant between the wheel cylinder pressure and braking force, $\mu_p$ denotes a friction coefficient between a brake pad and disk rotor, $r_p$ denotes an effective radius of the disk rotor, and R denotes a tire radius.

Hence, if the target difference pressure of the wheel cylinder front wheel cylinder pressure is $\Delta P(t)$, the target difference pressure $\Delta P(t)$ is expressed as follows:

$$\Delta P(t) = \Delta Bf(t)/k_p \tag{19}$$

Then, according to the target difference pressure $\Delta P(t)$ derived from the equation (19) and master cylinder pressure $P_{MCF}$, both first target wheel cylinder pressure $P^*_{1FL}(t)$ $P^*_{1FR}(t)$ and first target wheel cylinder pressure $P^*_{1R}(t)$ are set in the equations (20) through (22).

$$P^*_{1FL} = max(P_{MCF}(t) + \Delta P(t)/2, \Delta P(t), 0) \tag{20}$$

$$P^*_{1FL} = max(P_{WCF}(t) - \Delta P(t)/2, \Delta P(t), 0) \tag{21}$$

$$P^*_{1R}(t) = P_{MCR}(t) \tag{22}$$

, wherein max(A, B, C) in the equations (20) through (22) has a meaning of selecting a maximum value from among A, B, and C.

Hence, if the above-calculation is used to execute the target wheel cylinder pressure arithmetic operation processing shown in FIG. 6 by means of a calculation arithmetic processing unit 19c of the microcomputer 19, the first target wheel cylinder perssure for each tire wheel can be calculated which satisfies the target yaw rate in the veicle model.

That is to say, a target wheel cylinder pressure calculating processing shown in FIG. 6 is executed as a timer interrupt processing for each predetermined period $\Delta T$ (for example, 5 mS.).

Referring to FIG. 6, in a step S1, the CPU (arithmetic and logic operation unit 19c) in the microcomputer reads the steering angle detection value $\theta$ of the steering angle sensor 11, vehicle speed detection value Vx of the vehicle speed sensor 12.

In the next step S2, the CPU carries out the equations (7.2) through (7.6) from the previously set vehicular requirements and calculates the coefficients $a_{11}$ through $a_{22}$.

It is noted that constant portions $a_{11V}$ through $a_{22V}$ determined according to the vehicular requirements in the equations (7.2) through (7.6) are previously calculated using the following equations (23.1~23.4).

$$a_{11V} = -2 (K_f L_f^2 + K_r L_r^2)/I_z \tag{23.1}$$

$$a_{12V} = -2 (K_f L_f - K_r L_r)/M \tag{23.2}$$

$$a_{21V} = -2 (K_f L_f - K_r L_r)/M \tag{23.3}$$

$$a_{22V} = -2 (K_f + K_r)/M \tag{23.4}$$

Next, the routine goes to a step S3 in which the steady state yaw rate gain $H_0$ is calculated using the arithmetic operation of the equation (11) on the basis of the vehicle speed detection value Vx, the stability factor A calculated on the basis of the equation (12), the wheel base L determined according to the vehicle performance requirements, and steering gear ratio N.

The differential value $\psi''r(n)$ of the target yaw rate is calculated. Furthermore, from the calculated difference value $\psi''r(t)$ of the target yaw rate and a previous value $\psi''r(n-1)$ of the target yaw rate, the present target yaw rate $\psi''r(n)$ is calculated in accordance with the equation (24).

Then, the present target yaw rate $\psi'r(n)$ is calculated and updated in the target yaw rate storage area formed in the storage unit 19d.

$$\psi'r(n) = \psi'r(n-1) + \psi''r(n) \cdot \Delta T \tag{24},$$

wherein $\Delta T$ denotes a timer interrupt period.

Then, the routine goes to a step S4 in which the CPU calculates the arithmetic operation of the equation (15) from both target yaw rate $\psi'r(n)$ calculated in the step S3 and previous value of the lateral velocity Vyr(n−1) so as to derive a lateral direction acceleration Vyr'(n) and calculates the present lateral velocity Vyr(n) from the calculated lateral acceleration Vyr'(n) and a previous value Vyr(n−1) in the lateral velocity using the arithmetic operation of the equation (15). The present lateral velocity Vyr(n) is updated in a lateral velocity storage area of the storage unit 19d.

$$Vyr(n) = Vyr(n-1) + Vyr'(n) \cdot \Delta T \tag{25}$$

Next, the routine goes to a step S5 in which the CPU calculates the braking force difference ΔBf in accordance with the equation (16), calculates the equation of (19) on the basis of the calculated braking force difference ΔBf and the proportional constant $k_p$ calculated in accordance with the equation (18) to calculate the target difference pressure ΔP.

The routine, thereafter, goes to a step S6 in which a first target wheel cylinder pressure $P^*_{1FL}$ of the left front tire wheel is set to a larger value of either ($P_{MCF}+\Delta P/2$), ΔP, or 0. The first target wheel cylinder pressure $P^*_{1R}$ of the rear tire wheel is set to the master cylinder pressure $P_{MCR}$ and a timer interrupt processing is ended.

Hence, suppose now that the vehicle continues to run straightly, the vehicle speed detection value Vx from the vehicle speed sensor 12 corresponds to the vehicle speed value. However, the steering angle detection value θ from the steeing angle sensor 11 is zero. Furthermore, the previous value $\psi'r(n-1)$ of the target yaw rate and previous value $Vyr(n-1)$ of the lateral direction velocity become zeros. Therefore, although the steady state yaw rate gain $H_0$ calculated in the step S3 accords with the vehicle speed, differential value $\psi''r(n)$ of the target yaw rate becomes zero since the steering angle detection value θ of the right side first item in the equation (13) is zero and the previous value $\psi'r(n)$ of the target yaw rate is zero. Accordingly, both lateral diirection acceleration Vyr(n) and lateral velocity Vyr(n) give zeros. In addition, since the right and left front tire wheel braking force difference ΔBf calculated in the step S5 and target difference pressure ΔP indicate zeros and the vehicle is in the non-braking condition in the subsequent step S6, the values of the master cylinder pressures $P_{MCF}$, $P_{MCR}$ detected by means of the pressure responsive sensors 14MCF, 14MCR.

The first target wheel cylinder pressures $P^*_{1FL}$, $P^*_{1FR}$ and $P^*_{1R}$ are set to zero.

Then, when a brake pedal 4 is depressed from a straight running condition to be transferred into the braking state, the master cylinder pressures $P_{MCF}$, $P_{MCR}$ of the master cylinder 5 are increased so that the first target wheel cylinder pressures $P^*_{1FL}$, $P^*_{1FR}$, and $P^*_{1R}$ are set so as to be equal to the respective master cylinders $P_{MCF}$, $P_{MCF}$, and $P_{MCR}$.

On the other hand, if the driver handles the steering wheel to turn, e.g., left so that the vehicle is in the left cornering state, the steering angle sensor 11 outputs the steering angle detection value θ which increases in the positive direction according to the steering angle of the steering wheel 10. Therefore, the present value $\psi''r(n)$ of the differential value of the target yaw rate calculated in the step S3 indicates a value corresponding to the steady-state yaw rate gain $H_0$ and steering angle detection value θ so that the present value $\psi'r(n)$ of the target yaw rate is also increased in the positive direction. Accordingly, the present value Vyr'(n) of the lateral acceleration calculated in the step S4 varies in the positive direction or negative direction according to the vehicular performance requirements and vehicle speed. Then, the present value Vyr(n) in the lateral velocity varies in the positive direction or negative direction.

On the basis of the above-described values, the CPU calculates the braking force difference ΔBf of the right and left front tire wheels and target pressure difference ΔP in the step S5, sets, on the basis of the values of ΔBf and ΔP. the first target wheel cylinder pressure $P^*_{1FL}$ of the left front tire wheel to one larger value from among ($P_{MCF}+\Delta P/2$), ΔP, or 0, sets the first target wheel cylinder pressure $P^*_{1R}$ of the rear tire wheel to the master cylinder pressure $P_{MCR}$, and controls the wheel cylinder pressure of each wheel cylinder 1FL, 1FR, and 1R so that an appropriate yaw rate and lateral direction motion according to the vehicle speed and steering angle can be generated.

Next, when the steering wheel 10 is turned right from a straight running condition in the right turn state, the steering angle detection value θ of the steering angle sensor 11 indicates negative value. Therefore, the differential value $\psi''r(n)$ of the target yaw rate and target yaw rate $\psi'r(n)$ indicate negative values, respectively. However, basically, the same control as in the case of the left turn is carried out.

Next, on the basis of the tire wheel speed detection value of each tire wheel and forward and rearward velocities, a method for calculating the second target braking force for each tire wheel to control the tire wheel slip under a predetermined condition will be described.

Generally, the friction force generated between a tire and road surface becomes maximum when a slip rate therebetween is placed in a vicinity to 10% through 30%. In this case, a gripping force in the lateral direction can be secured. The slip rate s can be represented in the equation (26) using the vehicular forward/rearward velocity Vx and tire wheel speed Vw.

$$s=(Vx-Vw)/Vx \cdot 100 \qquad (26)$$

For example, on the basis of the tire wheel speed, the target tire wheel speed V*W(t) to give the slip rate of 20% can be calculated from the equation (27) which is derived from the equation (26).

$$V^*_W(t)=0.8 \cdot V_x(t) \qquad (27)$$

In addition, a target tire wheel deceleration $V^*_W$ can be defined in the following equation (28).

$$V^*_{WO}(t)=V^*_{WO}(t) \qquad (28)$$

, wherein $V'^*_{WO}(t)$ has a predetermined value.

Next, the CPU derives each deviation between the target tire wheel speed $V^*_W$, target tire wheel deceleration $V'^*_W(t)$, tire wheel speed detection value $V_{WFL}(t)$, $V_{WFR}(t)$, $V_{WR}(t)$ detected by means of the tire wheel speed sensors 17FL through 17R, and actual tire wheel decelerations $V'_{WFL}(t)$, $V'_{WFR}(t)$, and $V'_{WR}(t)$, adds a predetermined weight for each deviation to calculate target wheel cylinder pressure change rates per unit of time of the right and left front tire wheels and rear tire wheel $P'^*_{2FL}(t)$, $P'^*_{2FR}(t)$, and $P'^*_{2R}(t)$ using the following equations (29) through (31):

$$P^*_{2FL}(t) = K_1 \cdot (V_{WFL}(t) - V^*(t)) + K_2 \cdot (V'_{WFL}(t) - V^*_W(t)) \qquad (29)$$

$$P^*_{2FR}(t) = K_1 \cdot (V_{WFR}(t) - V^*(t)) + K_2 \cdot (V'_{WFL}(t) - V^*(t)) \qquad (30)$$

$$P^*_{2R}(t) = K_1 \cdot (V_{WR}(t) - V^*_W(t)) + K_2 \cdot (V'_{WR}(t) - V^*(t)) \qquad (31)$$

, wherein $K_1$ and $K_2$ denote predetermined values determined according to the vehicular performance requirements.

Suppose that first target wheel cylinder pressures $P^*_{1FL}(t_0)$, $P^*_{1FR}(t_0)$, and $P^*_{1R}(t_0)$ are initial values at the previous setting time $t_0$ from among the first target wheel cylinder pressures $P^*_{1FL}(t)$, $P^*_{1FR}(t)$, and $P^*_{1R}$ calculated in the equations (20) through (22) are assumed to be initial values. Integrated values of the target wheel cylinder persssure change rates $P'^*_{2FL}(t)$, $P^*_{2FR}(t)$, and $P^*_{2R}(t)$ calculated on the equations (29) through (31) are added so that the second target wheel cylinder pressures for the respective tire wheels $P^*_{2FL}(t)$, $P^*_{2FR}(t)$, and $P^*_{2R}(t)$ can be derived from the following equations (32) through (34).

$$P^*_{2FL}(t) = \max\left[0, P^*_{1FL}(t) + \int_{t_0}^{t} P^*_{2FL}(t)dt\right] \quad (32)$$

$$P^*_{2FR}(t) = \max\left[0, P^*_{1FR}(t) + \int_{t_0}^{t} P^*_{2FR}(t)dt\right] \quad (33)$$

$$P^*_{2R}(t) = \max\left[0, P^*_{1R}(t) + \int_{t_0}^{t} P^*(t)dt\right] \quad (34)$$

$$= \max\left[0, P_{MCR} + \int_{t_0}^{t} P^*_{2R}(t)dt\right]$$

According to the present invention, the CPU selects the lesser of the first target wheel cylinder pressure and second target wheel cylinder pressure as a final target wheel cylinder pressure.

Hence, the final target wheel cylinder pressures $P^*_{FL}(t)$, $P^*_{FR}(t)$, and $P^*_R(t)$ for the respective tire wheels are set using the following equations (35), (36), and (37).

$$P^*_{FL}(t) = \min\{P^*_{1FL}(t), P^*_{2FL}(t)\} \quad (35)$$

$$P^*_{FR}(t) = \min\{P^*_{1FR}(t), P^*_{2FR}(t)\} \quad (36)$$

$$P^*_R(t) = \min\{P^*_{1R}(t), P^*_{2R}(t)\} = \{P_{MCR}(t), P^*_{2R}(t)\} \quad (37)$$

, wherein min(A, B) in the equations (35) through (37) means the selection of a minimum value from either one of A or B.

Figure 7:
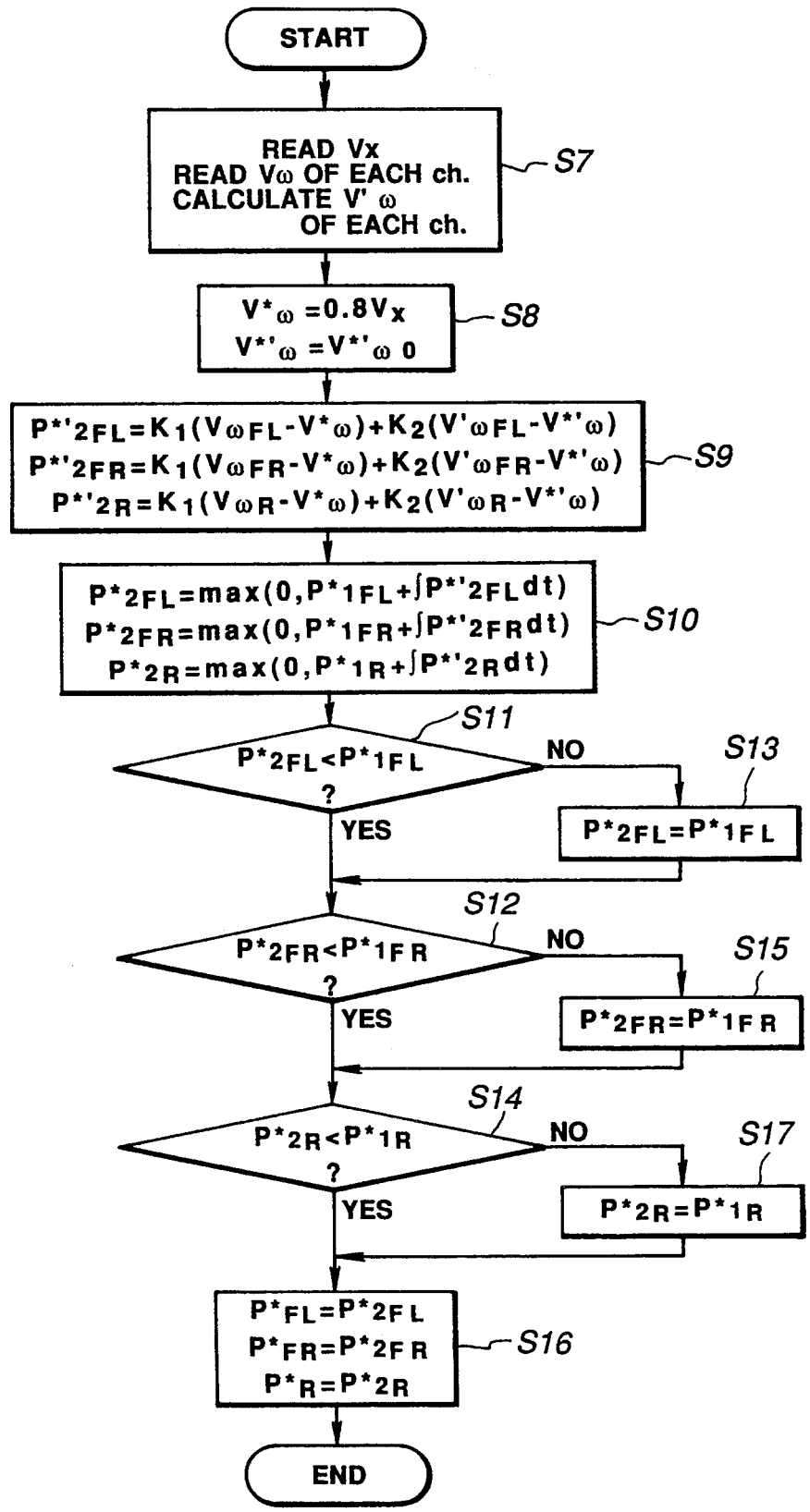
FIG. 7 is an operational flowchart of an example of processing second and final target braking force calculations in the braking pressure controlling system.

Hence, the above-described series of calculations are executed by means of the arithmetic and logic operation unit 19c (CPU) of the microcomputer 19 on the basis of the second target wheel cylinder pressure and final target wheel cylinder pressure arithmetic and operating processing shown in FIG. 7. Thus, the second is target wheel cylinder pressures in which slips of the tire wheels are made in predetermined conditions are calculated and either one of the first or second target wheel cylinder pressures can be set as a final target wheel cylinder pressure.

That is to say, the calculation processing of the target wheel cylinder shown in FIG. 7 is executed as a timer interrupt processing for each predetermined period ΔT (for example, 5 msec.) in the same way as the target wheel cylinder pressure calculating processing shown in FIG. 6.

First, in a step S7, the CPU reads the vehicle speed detection value $V_X$ of the vehicle speed sensor 12, tire wheel speed detection values $V_{WFL}(t)$, $V_{WFR}(t)$, and $V_{WR}(t)$ of the vehicle tire wheel speed sensors 17FL, 17FR, and 17R, and calculates the tire wheel decelerations $V'_{WFL}(t)$, $V'_{WFR}(t)$, and $V'_{WR}(t)$.

In a step S8, the CPU calculates the target tire wheel speed $V^*_W(t)$ according to the equation (27) and defines the target tire wheel deceleration $V'^*_W(t)$ according to the equation (28).

In a step S9, the CPU calculates the equations of (29) through (31) described above to derive the target wheel cylinder pressure change rates $P'^*_{2FL}(t)$, $P'^*_{2FR}(t)$, and $P'^*_{2R}(t)$.

In a step S10, the CPU calculates the equations (32) through (34) described above to set the second target wheel cylinder pressures $P^*_{2FL}(t)$, $P^*_{2FR}(t)$, and $P^*_{2R}(t)$.

In a step S11, the CPU compares the left front tire wheel second target wheel cylinder pressure $P^*_{2FL}(t)$ set in the step S10 with the left front-tire wheel first target wheel cylinder pressure $P^*_{1FL}(t)$ of the same tire wheel. If $P^*_{2FL}(t) < P^*_{1FL}(t)$ in the step S11, the routine goes to a step S12. If $P^*_{2FL}(t) \geq P^*_{1FL}(t)$, the routine goes to a step S13 in which $P^*_{2FL}(t) = P^*_{1FL}(t)$.

Thereafter, the routine goes to the step S12 as shown in FIG. 7.

In the step S12, the CPU compares the right front tire wheel second target wheel cylinder pressure $P^*_{2FR}(t)$ and the same tire wheel first target wheel cylinder pressure $P^*_{1FR}(t)$.

If $P^*_{2FR}(t) < P^*_{1FR}(t)$. the routine goes to a step S14. If $P^*_{2FR}(t) \geq P^*_{1FR}(t)$, the routine goes to a step S15 in which the second target wheel cylinder pressure $P^*_{2FR}(t)$ is reset to the first target wheel cylinder pressure $P^*_{1FR}(t)$ and the routine goes to a step S14.

In the step S14, the CPU compares the rear tire wheel second target wheel cylinder pressure $P^*_{2R}(t)$ and the first target wheel cylinder pressure $P^*_{1R}(t)$ of the same tire wheel.

If $P^*_{2R}(t) < P^*_{1R}(t)$, the routine goes to a step S16. If $P^*_{1R}(t) \leq P^*_{2R}(t)$, the routine goes to a step S17 in which $P^*_{1R}(t) = P^*_{2R}(t)$.

Then, the routine goes to the step S16.

In the step S16, when the second target wheel cylinder pressures are larger than the first target wheel cylinder pressures $P^*_{1FL}(t)$, $P^*_{1FR}(t)$, and $P^*_{1R}(t)$, respectively, the second taregt wheel cylinder pressures $P^*_{2FL}(t)$, $P^*_{2FR}(t)$, and $P^*_{2R}(t)$ which are reset to the same first target wheel cylinder pressures $P^*_{1FL}(t)$, $P^*_{1FR}(t)$, and $P^*_{1R}(t)$ are selected as the final target wheel cylinder pressures $P^*_{FL}(t)$, $P^*_{FR}(t)$, and $P^*_R(t)$ to finish the timer interrupt processing.

These steps S11, S13, and S16 serve to calculate the equation (35) and the steps S12, S15, and S16 serve to calculate the equation (36), and steps S14, S17, and S16 serve to calculate the equation (37).

Hence, when the vehicle runs continuously on a straight road, the first target wheel cylinder pressures $P^*_{1FL}$, $P^*_{1FR}$, and $P^*_{1R}$ are each set to zero. For example, the left front tire wheel second target wheel cylinder pressure $P^*_{2FL}$ set as zero in the step S10 is determined not to be less than the left front tire wheel first target wheel cylinder pressure $P^*_{1FL}$ in the step S12. Then, in the step S13, the same second target wheel cylinder pressure $P^*_{2FL}$ is set to the same first target wheel cylinder pressure $P^*_{1FL}$, i.e., zero. In addition, in the step S10, when the left front tire wheel second target wheel cylinder pressure $P^*_{2FL}$ is set as a positive value according to the equation (32), it is set to zero in the same way as described above in the step S13. In this case, the left front tire wheel second target wheel cylinder pressure $P^*_{2FL}$ calculated in the equation (32) cannot indicate a negative value.

The right front tire wheel second target wheel cylinder pressure $P^*_{2FR}$ is set to zero in the step S15 and the rear tire wheel second target wheel cylinder $P^*_{2R}$ is set to zero in the step S17, respectively. Then, in the step S16, each tire wheel final target wheel cylinder pressure $P^*_{FL}$, $P^*_{FR}$, and $P^*_{R}$ are all set to zeroes.

However, as the vehicle run is transferred from the straight running state to the braking state, each first target wheel cylinder pressure $P^*_{1FL}$, $P^*_{1FR}$, and $P^*_{1R}$ is equally set as each master cylinder pressure $P_{MCF}$, $P_{MCF}$, and $P_{MCR}$. Hence, the second target wheel cylinder pressures $P^*_{2FL}$, $P^*_{2FR}$, and $P^*_{2R}$ are set as sums of the master cylinder pressure $P_{MCF}$, $P_{MCF}$, and $P_{MCR}$ in the step S10 with integrated values of target wheel cylinder pressure change rates $P'^*_{2FL}$, $P'^*_{2FR}$, and $P'^*_{2R}$.

In the step S16, if the integrated value of each target wheel cylinder pressure change rate $P'^*_{2FL}$, $P'^*_{2FL}$, $P'^*_{2FR}$, and $P'^*_{2R}$ indicate positive, the final target wheel cylinder pressures $P^*_{FL}$, $P^*_{2FR}$, and $P^*_{R}$ are set to the second target wheel cylinder pressures $P^*_{2FL}$, $P^*_{2FR}$, and $P^*_{2R}$. If the integrated values of the target wheel cylinder pressure change rates $P'^*_{2FL}$, $P'^*_{2FR}$, and $P'^*_{2R}$ indicates negative, the final target wheel cylinder pressures $P^*_{FL}$, $P^*_{FR}$, and $P^*_{R}$ are set equally to the respective master cylinder pressures $P_{MCF}$, $P_{MCF}$, and $P_{WCR}$.

On the other hand, when the vehicle run is transferred from the straight cruise speed running state to the left turnning state, the left front tire wheel first target cylinder pressure $P^*_{1FL}$ is set to any largest value of ($P_{MCF}{}^{\Delta P/2}$), $\Delta P$, or 0. Since, on the other hand, the left front tire wheel tire wheel speed $V_{WFL}$ and left front tire wheel deceleration $V'_{WFL}$ in the step S9 become larger, the left front tire wheel second target wheel cylinder pressure $P^*_{2FL}$ indicates the sum of the integrated value of the corresponding target wheel cylinder pressure change rate $P'^*_{2FL}$ and the first target cylinder pressure $P^*_{1FL}$. Then, in the step S16, the final target wheel cylinder pressure $P^*_{FL}$ is set to the lesser of the first target wheel cylinder pressure $P^*_{1FL}$ or second target wheel cylinder presure $P^*_{2FL}$.

Similarly, the right front tire wheel first target wheel cylinder pressure $P^*_{1FR}$ is set to any largest value of ($P_{MCF} - \Delta P/2$), $\Delta P$, or 0. Since, on the other hand, the right front tire wheel speed $V_{WFR}$ and right front tire wheel deceleration $V'_{WFR}$ become less, the right front tire wheel second target wheel cylinder pressure $P^*_{2FR}$ indicates the sum of the integrated value of the corresponding target wheel cylinder pressure change rate $P'^*_{2FR}$ and first target cylinder pressure $P^*_{1FR}$. Then, in the step S16, the final target wheel cylinder pressure $P^*_{FR}$ is set to either less value of the first target wheel cylinder pressure $P^*_{1FR}$ or the second target wheel cylinder pressure $P^*_{2FR}$.

As described above, the rear tire wheel first target wheel cylinder pressure $P^*_{1R}$ is set to the rear tire wheel master cylinder pressure $P_{MCR}$. On the other hand, since the rear tire wheel speed $V_{WR}$ in the equation (31) of the step S9 and rear tire wheel deceleration $V'_{WR}$ are not varied, the right front tire wheel second target wheel cylinder pressure $P^*_{2R}$ indicates a sum of the integrated value of the target wheel cylinder pressure change rate $P'^*_{2R}$ and master cylinder pressure $P_{WCR}$ in the same way as in the case of the vehicle straight running state.

Then, in the step S16, the rear tire wheel final target wheel cylinder pressure $P^*_{R}$ is set to the second target wheel cylinder pressure $P^*_{2R}$ in the case where the integrated value of the target wheel cylinder pressure change rate $P'^*_{2R}$ indicates positive. If the integrated value of the target wheel cylinder pressure change rate $P'^*_{2R}$ indicates negative, the rear tire wheel final target wheel cylinder pressure $P^*_{R}$ is set equal to the master cylinder pressure $P_{WCR}$.

Next, when the vehicle run is transferred from the straight running state to the right turning state, both the left front tire wheel speed $V_{WFL}$ and left front tire deceleration $V'_{WFL}$ in the equation (29) of the step S9 become less and both right front tire wheel speed $V_{WFR}$ and right front tire wheel deceleration $V'_{WFR}$ in the equation (30) become larger, the same control as in the case of the left turning state being carried out.

Figure 8:
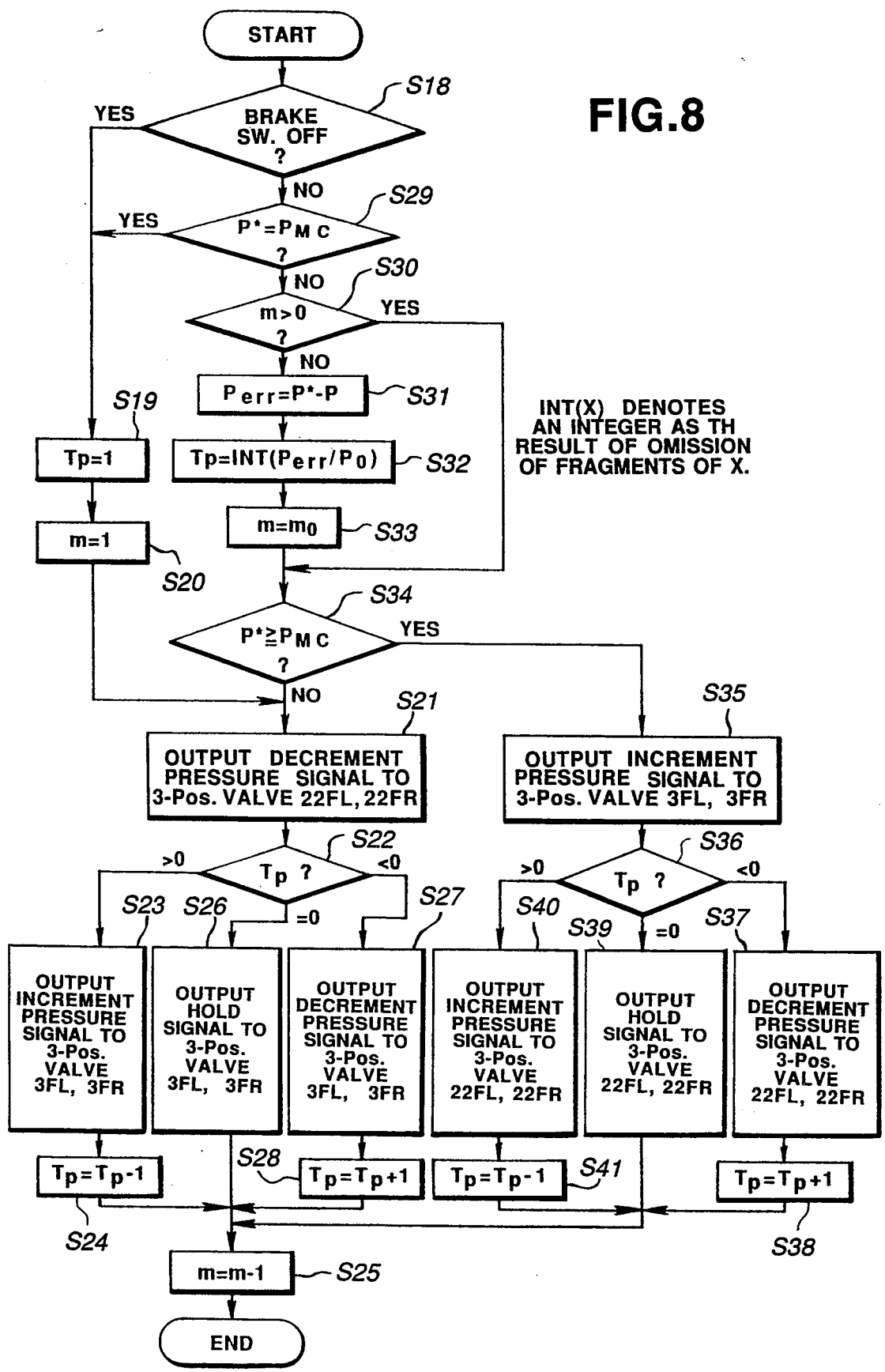
FIG. 8 is an operational flowchart of an example of processing a front tire wheel target braking force control in the braking force controlling system.
Figure 9:
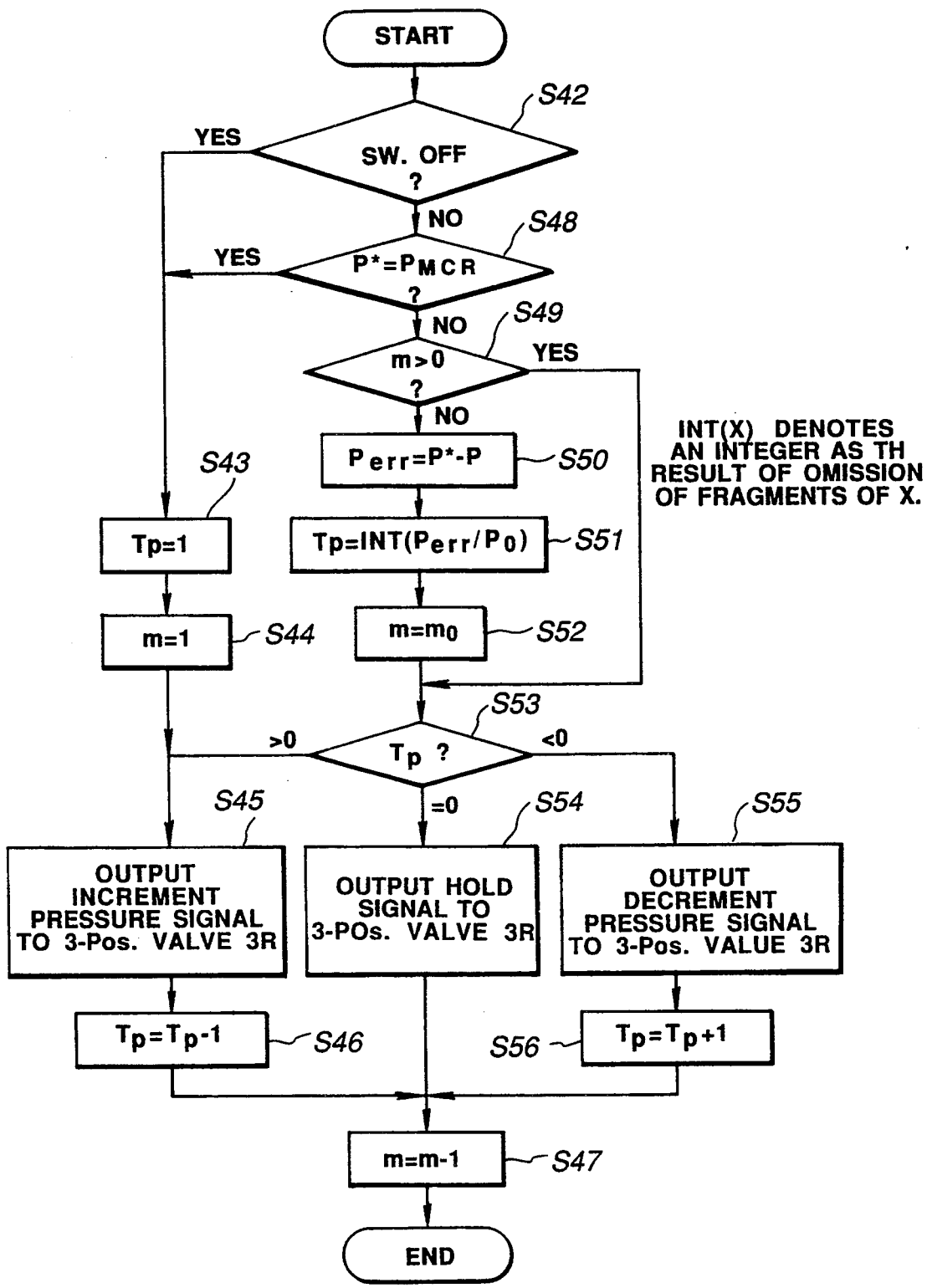
FIG. 9 is an operational flowchart of an example of processing a rear tire wheel target braking force control in the braking force controlling system.

When the front tire wheel and rear tire wheel sides are subjected to the braking force control processing shown in FIGS. 8 and 9 so as to satisfy the final target wheel cylinder pressures $P^*_{FL}$, $P^*_{FR}$, and $P^*_{R}$, motion values of the vechicular yaw rate, lateral direction motion value, and so on can be matched with their target motion values or the vehicle tire wheel slips can be controlled to reach a predetermined condition.

FIG. 8 represents a braking force control processing for the left front tire wheel wheel cylinder 1FL and FIG. 9 represents a braking force control processing for the rear tire wheel wheel cylinders 1RL, 1RR.

The front tire wheel braking force control processing shown in FIG. 8 is individually and separately executed for each of the right front and left front tire wheels as the timer interrupt processing of a predetermined period $\Delta T$ in the same way as in the target cylinder pressure calculating processing in FIG. 6.

That is to say, in a step S18, the CPU determines whether the brake switch 13 is in the ON state. If the brake switch 13 is in the OFF state, the CPU determines that the vehicle is in the non-braking state and the routine goes to a step S19.

In the step S19, the CPU sets a varible Tp representing a hold time of the output control signal to "1". In a step S20, the CPU sets a variable m representing a period for monitoring an error between the final target wheel cylinder pressure $P^*_{FL}$ and actual cylinder pressure $P_{FL}$ to "1". Then, in a step S21, the CPU outputs the control signal $CS_{FL2}$ as a deceleration signal of "0", for the other actuator 15, to the constant current supply circuit 20FL2 and the routine goes to a step S22.

In the step S22, the CPU determines whether the variable Tp indicates positive, 0, or negative.

If Tp>0, the routine goes to a step S23 in which, for the one actuator 2, the CPU outputs the control signal $CS_{FL1}$ as the pressure increase signal of "0" to the constant current supply circuit 20FL1. In a step S24, the CPU calculates a new coefficient Tp by subtracting "1" from the variable Tp and updates and store the new coefficient Tp into a coefficient storing area formed in the storage unit 19d. Then, the present timer interrupt processing is ended and the routine returns to its main program. If, on the other hand, Tp=0 in the step S22, the routine goes to a step S26 in which, for the one actuator 2, the CPU outputs the control signal $CS_{FL1}$ as the hold signal for a first predetermined voltage $V_{S11}$ and the routine goes to a step S25 and returns to the main program.

On the other hand, if Tp<0 in the step S22, the routine goes to a step S27 in which, for the one actuator 2, the CPU outputs the control signal $CS_{FL1}$ as the pressure decrease signal for a second predetermined voltage $V_{S12}$ which is higher than the first predetermined voltage $V_{S11}$. In a step S28, the CPU updates and stores the variable Tp which is added by "1" as a new variable Tp in the variable storage area and the routine goes to the step S25. Then, the routine returns to the main program.

In addition, when the brake switch 13 is in the on state as the result of determination in the step S18, the CPU determines that the vehicle is in the braking state and the routine returns to the step S29 in which the CPU determines whether the final target wheel cylinder pressure $P*_{FL}$ calculated in the target cylinder pressure calculating processing coincides with the master cylinder pressure $P_{WCF}$. If they coincide with each other, the routine goes to a step S19. If they do not coincide with each other, the routine goes to a step S30.

In the step S30, the CPU determines whether the variable m indicates positive. If m>0, the routine goes to a step S34. If m≦0, the routine goes to a step S31.

In the step S31, the CPU calculates an error Perr ($=P*_{FL}-P_{FL}$) between the final target wheel cylinder pressure $P*_{FL}$ and present cylinder pressure detection value $P_{FL}$ and the routine goes to the step S32.

In the step S32, the CPU derives the variable Tp according to the following equation (38) which omits the fragements of the value in which the error Perr is divided by a reference value $P_0$.

$$Tp = INT (Perr/P_0) \quad (38)$$

In a step S33, the CPU sets the variable m to a positive predetermined value $m_0$ and the routine goes to a step S34.

In the step S34, the CPU determines whether the final target cylinder pressure $P*_{FL}$ exceeds the master cylinder pressure $P_{WCF}$. If $P*_{FL} \geqq P_{MCF}$, the routine goes to the step S21 and if $P*_{FL} < P_{MCF}$, the routine goes to a step S35.

In the step S35, the CPU outputs the control signal $CS_{FL1}$ as the pressure increase signal of "0", for the one actuator 2, to the constant current supply circuit 20FL1 and the routine goes to a step S36.

In the step S36, the CPU determines whether the variable Tp indicates a positive, "0", or negative. If Tp<0, the routine goes to a step S37 in which the CPU, for the other actuator 15, outputs the control signal $CS_{FL2}$ as the pressure decreace signal of "0" to the constant current supply circuit 20FL2. Next, in a step S38, the CPU calculates the new coefficient Tp in which "1" added to the variable Tp and updates and stores the coefficient Tp in the coefficiet storage area of the storage unit 19d and the routine goes to a step S25 in which "1" is subtracted from the variable m to provide the new variable m which is updated and stored into the variable sotrage area of the storage unit 19d and the timer processing is ended. Then, the routine is returned to the main program.

On the other hand, if Tp=0 in the step S36, the routine goes to a step S39 in which the CPU outputs, for the other actuator 15, the control signal $CS_{FL2}$ as the hold signal for the first predetermined voltage $V_{S21}$ and the routine goes to the step S25. Then, the routine is returned to the main program.

If Tp>0 in the step S36, the routine goes to a step S40 and the CPU outputs the control signal $CS_{FL2}$ as the pressure increase signal of the second predetermined voltage $V_{S22}$ which is higher than the first predetermined voltage $V_{S21}$. In the next step S41, the CPU subtracts "1" from the variable Tp and the result of subtraction is updated and stored into the variable storage area and the routine geos to the step S25. Then, the routine returns to the main program.

Hence, since the brake switch 13 is in the off state, the vehicle running in the non-braking state, the routine goes from the step S18 to the step S21 via the steps S19 and S20 and the CPU outputs the control signal $CS_{FL2}$ (or $CS_{FR2}$) of the level "0" as the pressure decrease signal to the constant current supply circuit 20FL2 (or 20$CS_{FR2}$). Therefore, since no energization signal is output from the constant current supply circuit 20FL2 (or 20FR2). the solenoid operated direction select valve 22FL (or 20FR) of the other actuator 15 is held in the normal position.

In the subsequent step S22, since Tp>0, the routine goes to the step S23 in which the CPU outputs the control signal $CS_{FL1}$ of the level "0" as the pressure increase signal to the constant current supply circuit 20FL1 (or 20FR1). Therefore, the constant current supply circuit 20FL1 (or 20FR1) does not output the energization current so that the solenoid operated direction select valve 3FL (or 3FR) of the one actuator 2 is held in the normal position and the front tire side wheel cylinder 1FL (or 1FR) is communicated with the master cylinder 5.

At this time, since the driver does not depress the brake pedal 4, the master cylinder pressure $P_{MCF}$ to be output from the master cylinder 5 indicates zero and the wheel cylinder pressure of each wheel cylinder 1FL (or 1FR) indicates zero as well. Consequently, no braking force is generated and the non-braking state is maintained.

Then, if the vehicle driver depresses the brake pedal 4 for the vehicle to be in the braking state, the routine in FIG. 8 is advanced from the step S18 to the step S29 in which the CPU determines whether the final target wheel cylinder pressure $P*_{FL}$ (or $P*_{FR}$) calculated in the target wheel cylinder pressure calculating processing in FIG. 7 is coincident with the master cylinder pressure $P_{MCF}$, respectively.

This determination is based on whether the vehicle is in the straight running condition with no slip occurrence on the tire wheels or in the turning state. If during the straight running state the final target wheel cylinder pressure $P*_{FL}$ (or $P*_{FR}$) is set equally to the master cylinder pressure $P_{WCF}$, the routine goes from the step S29 to the step S19. Then, the control signal $CS_{FL1}$ (or $CS_{FR1}$) is zeroed in the same way as in the non-braking state so that the solenoid operated direction s select valve 2FL (or 3FR) is placed in the normal position, thus the master cylinder 5 and each wheel cylinder 1FL (or 1FR) being communicated with each other.

Therefore, the wheel cylinder pressure $P_{FL}$ (or $P_{FR}$) of each wheel cylinder 1FL (or 1FR) is increased so as to be equal to the master cylinder pressure $P_{WCF}$. Thus, the same braking force with each wheel cylinder 1FL and 1FR is generated.

However, when either of right or left front tire wheel slips, the vehicle is braked, the vehicle being turned, or the vehicle's run in the braked condition is transferred to the turning state, and the final target wheel cylinder pressure $P*_{FL}$ (or $P*_{FR}$) is set to a different value from the master cylinder pressure $P_{WCF}$ in the series of processings of FIGS. 6 and 7, the routine is advanced from a step S29 to a step S30. In the processing of the previous step S25, the variable m is set to "0" so that the routine goes to the step S31. Therefore, in the step S31, the CPU calculates the error Perr between each final target wheel cylinder presure $P^*_{FL}$ (or $P_{FR}$) and the pressure detection value $P_{FL}$ (or $P_{FR}$) of the pressure responsive sensor 14FL (or 14FR), in the step S32, the CPU calculates the variable Tp by subtracting a set value $P_0$ representing a tolerance range from the error Perr, and, in the step S33, the CPU sets the variable m to a positive presetermined value $m_0$. Then, the routine goes to a step S34.

Then, if the final target wheel cylinder pressure $P^*_{FL}$ (or $P^*_{FR2}$) is below the master cylinder perssure $P_{MCF}$, the routine goes to the step S21 in which the CPU outputs the control signal $CS_{FL2}$ (or $CS_{FR2}$) which is set to zero so that the other actuator 15 is transferred in the pressure decrease mode and the routine goes to the step S22. At this time, if the pressure detection value $P_{FL}$ (or $P_{FR}$) of each pressure sensor 14FL (or 14FR) does not reach the final target wheel cylinder pressure $P^*_{FL}$ (or $P^*_{FR}$), the variable Tp indicates a positive value. Therefore, the routine goes to the step S23 in which the CPU sets the control signal $CS_{FL1}$ (or $CS_{FR1}$) to zero so that the pressure increase mode of the one actuator 2 is continued in the pressure increase mode.

When the operation flow is repeated with the turnning state and braking state continued, in the step S24, the CPU subtracts the variable Tp by "1" and, in the step S25, the variable m is subtracted by "1". If the variable Tp becomes zero, the routine goes from the step S22 to the step S26 in which the CPU or microcomputer outputs the control signal $CS_{FL1}$ (or $CS_{FR1}$) of the first predetermined voltage $V_{S11}$ (or $CS_{FR1}$) to the constant current supply circuit 20FL1 (or 20FR1) as the hold signal. Therefore, since the energization current corresponding to the predetermined voltage $V_{S11}$ is output to the solenoid operated direction select valve 3FL (or 3FR), the solenoid operated direction select valve 3FL (or 3FR) is switched into the second switching position so that the connection between the wheel cylinder 1FL (or 1FR) and the master cylinder 5 is interrupted. Then, the cylinder pressure $P_{FL}$ (or $P_{FR}$) of the wheel cylinder 1FL (or 1FR) is maintained constant (hold mode) and the hold mode is continued until, in the step S20, the variable m indicates "0".

Thereafter, if the variable m indicates "0", the routine goes again to the step S31. At this time, if the error pressure value Perr is below ½ of the set pressure $P_0$, the variable Tp calculated in the step S32 indicates "0". Then, the routine is advanced from the step S22 to the step S26 in which the hold mode is maintained so that the wheel cylinder pressure $P_{FL}$ (or $P_{FR}$) of the wheel cylinder 1FL (or 1FR) is maintained in the final target wheel cylinder $P^*_{FL}$ (or $P^*_{FR}$).

In addition, since the wheel cylinder pressure $P_{FL}$ (or $P_{FR}$) of each wheel cylinder 1FL (or 1FR) is higher than the final target wheel cylinder pressure $P^*_{FL}$ (or $P^*_{FR}$), the error Perr calculated in the step S31 indicates a negative value. The value of Tp also indicates the negative value. Thus, the routine goes from the step S22 to the step S27 in which the CPU outputs the control signal $CS_{FL1}$ (or $CS_{FR1}$) having the predetermined voltage $V_{S12}$ as the pressure decrease signal. Therefore, the energization current corresponding to the voltage $V_{S12}$ is supplied from the constant current supply circuit 20FL1 (or 20FR1) to the solenoid operated direction select valve 3FL (or 3FR) so as to be placed in the third switching position. Hence, the wheel cylinder 1FL (or 1FR) is communicated with the master cylinder 5 via a hydraulic pump 7F. Thus, the cylinder pressure $P_{FL}$ (or $P_{FR}$) of the wheel cylinder 1FL (or 1FR) is decreased in the presure decrease mode until the variable Tp indicates zero.

On the other hand, in a case where the final target wheel cylinder pressure $P^*_{FL}$ (or $P^*_{FR}$) is above the master cylinder pressure $P_{MCF}$, the routine is transferred from the step S34 to the step S35. With the control signal $CS_{FL1}$ (or $CS_{FR1}$) set to zero and the one actuator 2 in the pressure increase mode, the routine goes to the step S36. If, at this time, the wheel cylinder pressure $P_{FL}$ (or $P_{FR}$) of each pressure sensor 14FL (14FR) does not arrive at the final target wheel cylinder pressure $P^*_{FL}$ (or $P^*_{FR}$), the routine goes to the step S40 since the variable Tp calculated in the step S32 indicates the positive value. In the step S40, the CPU outputs the control signal $CS_{FL2}$ (or $CS_{FR2}$) of the second predetermined voltage $V_{S22}$ as the pressure decrease signal for the other actuator 5. Thus, the energization current corresponding to the predetermined voltage $V_{S22}$ is supplied from the constant current supply circuit 20FL2 (or 20FR2) to the solenoid operated direction select valve 22FL (or 22FR) so as to be placed in the third switching position. Hence, the braking liquid in the accumulator 28 is pressurized and supplied to the solenoid operated direction select valve 22FL (22FR) so that the rod of the piston 23FL (or 23FR) serves to switch the direction select valve 21FL (or is 21FR) and the connection between the wheel cylinder 1FL (or 1FR) and the one actuator 2 is interrupted. Simultaneously, the braking liquid in the plunger type piston 23FL (or 23FR) is pressurized and supplied so that the wheel cylinder pressure $P_{FL}$ (or $P_{FR}$) of the wheel cylinder 1FL (or 1FR) is increased in the pressure increase mode.

When such an operation flow as described above is repeated with the turning state and braking state continued, the CPU subtracts from the variable Tp in the step S41. In the step S25, the CPU subtracts "1" from the variable m. If the variable Tp indicates zero, the routine is transferred from the step S36 to the step S39 in which the CPU outputs the control signal $CS_{FL2}$ (or $CS_{FR2}$) of the first predetermined voltage $V_{S21}$ to the constant current supply circuit 20FL2 (or 20FR2) as the hold signal.

Therefore, since the energization current corresponding to the predetermined voltage $V_{S21}$ is supplied from the constant current supply circuit 20FL2 (or 20FR2) and is output to the solenoid operated direction select valve 22FL (or 22FR) of the other actuator 15 so that the solenoid operated direction select valve 22FL (or 22FR) is switched at the second switching position. Then, the connection between the plunger type piston 23FL (or 23FR) and accumulator 28 is interrupted so that the rod of the piston 23FL (or 23FR) and select valve 21FL (or 21FR) are held at their present positions and the wheel cylinder pressure $P_{FL}$ (or $P_{FR}$) of the wheel cylinder 1FL (or 1FR) are in the hold mode (maintained constant) until, in the step S25, the variable m indicates "0".

Thereafter, the variable m is set to "0" and the routine again goes to the step S31. If, at this time, the error pressure Perr is below ½ of the set pressure $P_0$, the variable Tp indicates "0" calculated in the step S32 and the pressure mode is in the hold mode in the step S39 from the step S36 so that the wheel cylinder pressure $P_{FL}$ (or $P_{FR}$) of the wheel cylinder 1FL (or 1FR) is maintained at the final target wheel cylinder pressure $P^*_{FL}$ (or $P^*_{FR}$).

In addition, if the wheel cylinder pressure $P_{FL}$ (or $P_{FR}$) of each wheel cylinder 1FL (or 1FR) is higher than the target wheel cylinder pressure 1FL (or 1FR), the error Perr calculated in the step S31 indicates the negative value and the variable Tp indicates accordingly the negative value. The routine goes from the step S36 to the step S37 in which the control signal $CS_{FL2}$ (or $CS_{FR2}$) is set to zero so that the solenoid operated direction select valve 22FL (or 22FR) is returned to the first switching position. Thus, the plunger type piston 23FL (or 23FR) and reservoir tank 25F are communicated with each other and relieved. When the rod of the piston 23FL (or 21FR) is retracted, the solenoid operated direction select valve 21FL (or 21FR) is switched in the normal position. Hence, the wheel cylinder pressure $P_{FL}$ (or $P_{FR}$) of the wheel cylinder 1FL (or 1FR) is decreased so as to be in the pressure decrease mode until the variable Tp indicates "0".

On the other hand, the rear the wheel side braking force controlling processing shown in FIG. 9 will be executed as the timer interrupt processing of the predetermined period $\Delta T$ in the same way as the target cylinder pressure calculating processing of FIG. 6.

That is to say, in a step S42, the CPU determines whether the brake switch 13 is in the on state. If the brake switch 13 is in the off state, the CPU determines that the vehicle is in the non-braking state and the routine goes to a step S43.

In the step S43, the CPU sets the variable Tp representing the hold duration of time of the output control signal to "1" and, in a step S44, the CPU sets the variable m to "1" which represents the period monitoring the error between the rear tire wheel target wheel cylinder pressure $P^*_R$ and actual rear tire wheel cylinder pressure $P_R$. Thereafter, the routine is transferred to the step S45.

In the step S45, the CPU outputs, for the one actuator 2, the control signal $CS_R$ as the pressure increase signal of "0" to the constant current supply circuit 20R.

In the next step S46, the new coefficient Tp which is a subtracted result by "1" from the variable Tp and is updated and stored in the coefficient storage unit area formed in the storage unit 19d. Thereafter, the routine goes to a step S47 in which a value of "1" is subtracted from the variable m and the result of subtraction is set to a new variable m and is updated and stored in the variable storage area formed in the storage unit 19d and the timer interrupt processing is ended and the routine is returned to the main program.

In addition, when the brake switch 13 is in the on state according to the result of determination in the step S42, the CPU determines that the vehicle is in the braking state and the routine is transferred to the step S48. In the step S48, the CPU determines whether the final target wheel cylinder pressure $P^*_R$ calculated in the target wheel cylinder pressure calculating processing coincides with the master cylinde $P_{MCR}$. If both pressure values are coicident with each other, the routine goes to a step S43. If both pressure values are not coincident with each other, the routine goes to a step S49.

In the step S49, the CPU determines whether the variable m indicates positive. If m>0, the routine goes to a step S53. If m≦0, the routine goes to a step S50.

In the step S50, the CPU calculates the error Perr ($=P^*_R-P_R$) between the final target wheel cylinder pressure $P^*_R$ and present wheel cylinder pressure detection value $P_R$ and the routine goes to a step S51.

In the step S51, the CPU calculates the variable Tp in accordance with the equation (38) in which a value of the error Perr is subtracted from a reference value $P_o$ and the result of the subtraction is half-adjusted.

In the next step S52, the CPU sets the variable m to the predetermined positive value $m_o$ and the routine goes to a step S53.

In the step S53, the CPU determines whether the variable Tp indicates positive, "0", or furthermore negative.

If Tp>0, the routine goes to a step S45 in which the one actuator 2 is placed in the pressure increase state. If Tp=0 in the step S53, the routine goes to a step S54 in which the control signal $CS_R$ as the hold signal of the first predetermined voltage $V_{S1R}$ is output toward the one actuator 2 and the routine goes to a step S47. Then, the routine returns to the main program.

On the other hand, if Tp<0 in the step S53, the routine is transferred to a step S55.

In the step S55, the control signal $CS_R$ is output as the pressure decrease signal having the seocnd predetermined voltage $V_{S2R}$ higher than the first predetermined voltage $V_{S1R}$, for the one actuator 2.

In the next step S56, the CPU adds the variable Tp to "1" and the added result is set as a new variable Tp which is updated and stored in the variable storage area and the routine goes to a step S47. Then, the routine is returned to the main program.

Hence, when the vehicle runs in the non-braking state, the routine is advanced to the step S45 via the steps S43 and S44 since the brake switch 13 is in the off state. At this time, the control signal $CS_R$ of "0" is output to the constant current supply circuit 20R as the pressure increase signal. Therefore, no energization current is output from the constant current supply circuit 20R. The solenoid operated direction select valve 3R of the one actuator 2 is maintained at the normal position and the rear tire wheel cylinders 1RL, 1RR are communicated with the master cylinder 5.

At this time, since the brake pedal 4 is not operated, the master cylinder pressure $P_{MCR}$ output from the master cylinder 5 indicates zero and the wheel cylinder pressure of each wheel cylinder 1RL, 1RR also indicates zero. Thus, no braking force is generated and the non-braking state is continued.

When the brake pedal 4 is depressed and the vehicle is in the braking state, the routine goes from the step S42 in FIG. 9 to the step S48. In the step S48, the CPU determines whether the final target wheel cylinder pressure $P^*_R$ calculated in the target wheel cylinder pressure calcualting processing of FIG. 7 coincides with the master cylinder pressure $P_{WCR}$ of the master cylinder 5. If the final target wheel cylinder pressure $P^*_R$ is equal to the master cylinder pressure $P^*_{WCR}$, the routine goes from the step S48 to the step S43 in which the control signal $CS_R$ is returned to zero in the same way as the non-braking state and the solenoid operated direction select valve 3R is placed in the normal position. Thus, the master cylinder 5 is communicated with each wheel cylinder 1RL, 1RR. The wheel cylinder pressure $P_R$ of each wheel cylinder 1RL, 1RR is increased upto the value equal to the master cylinder pressure $P_{MCR}$. The same braking forces as for both wheel cylinders 1RL, 1RR are generated.

When the tire wheel slips, the vehicle is turned and braked, or the vehicle is turned in the braking state and the final target wheel cylinder pressure $P^*_R$ at the processing of FIGS. 6 and 7 is set to a value different from the master cylinder $P_{MCR}$, the routine is transferred from the step S48 to the step S49. Then, since the variable m is set to "0" in the processing of the previous step S47, the routine goes to a step S50. The error Perr between the final target wheel cylinder pressure $P^*_R$ and the pressure detection value $P_R$ of the pressure responsive sensor 14R is calculated in the step S50. The variable Tp is calculated by dividing the error Perr by the set value $P_R$ representing the tolerance range. Next, the variable m is set to the positive predetermined value $m_0$ in the step S52 and the routine goes to the step S53.

At this time, when the pressure detection value $P_R$ of the pressure responsive sensor 14R does not reach the final target wheel cylinder pressure $P^*_R$, the variable Tp indicates the positive value. Then, the routine goes to the step S45 in which the control signal $CS_R$ is set to zero and the pressure increase mode in the case of the on eactuator 2 is continued. When the turning state and braking state are repeated so that the operation flow described above is repeated, the variable Tp is decremented by "1" in the step S46 and the variable m is subtracted by "1" in the step S47. However, as the variable Tp indicates zero, the routine goes from the step S53 to the step S54 in which the control signal $CS_R$ having the first predetermined voltage $V_{S1R}$ is output to the constant current supply circuit 20R as the hold signal. Therefore, since the energization current corresponding to the first predetermined voltage $V_{S1R}$ is output to the solenoid operated direction select valve 3R from the constant current supply circuit 20R. Consequently, the solenoid operated direction select valve 3R is switched into the second switching position and the connection between the wheel cylinders 1RL. 1RR and master cylinder 5 is interrupted. Thus, the cylinder pressure $P_R$ of the wheel cylinders 1RL, 1RR are held at the constant value (hold mode). The hold mode is continued until the variable m, in the step S47, indicates "0".

Thereafter, when the variable m indicates "0", the routine goes to the step S50. At this time, when the error pressure Perr is below ½ of the set pressure $P_0$, the variable Tp calculated in the step S51 indicates "0". Then, the routine goes from the step S53 to the step S54 in which the hold mode is maintained so that the wheel cylinder pressure $P_R$ of the wheel cylinders 1RL, 1RR is maintained at the final target wheel cylinder pressure $P^*_R$.

In addition, if the wheel cylinder pressure $P_R$ of each wheel cylinder 1RL, 1RR is higher than the final target wheel cylinder pressure $P^*_R$, the error Perr calculated in the step S50 indicates negative value. Then, the routine goes from the step S53 to the step S55 in which the CPU outputs the control signal $CS_R$ having the predetermined voltage $V_{S2R}$ to the constant current supply circuit 20R as the pressure decrease signal. Therefore, since the energization current corresponding to the predetermined voltage $V_{S2R}$ is supplied to the solenoid operated direction select valve 3R so as to be placed in the thrid switching position. Hence, the wheel cylinders 1RL, 1RR are communicated with the master cylinder 5 via the hydraulic pump 7R. Thus, the wheel cylinders 1RL, 1RR are in the pressure decrease mode in which the wheel cylinder pressure $P_R$ is decreased until the variable Tp indicates "0".

In the above-described preferred embodiment, although the case where the braking force difference between the right and left front tire wheels is controlled will be described, it may be alternatively carried out to control the braking force difference of the right and left rear tire wheels or front tire wheels.

Although, in the preferred embodiment, the yaw rate and motion value in the lateral direction are adopted as the motion target value of the vehicle, another motion target value may be set.

In addition, although, in the preferred embodment, the steering angle sensor 11 is applied as the vehicular steering state detecting means, an actual steering angle of one or any of the tire wheels may be detected in place of the steering angle sensor 11. In this case, the steering gear ratio N in the equations (3), (7.6), and (7.7) is omitted.

Furthermore, although the vehicle speed sensor 12 is applied as the speed detecting means, it may be calculated as the vehicle forward/rearward speed by detecting the tire wheel speed and vehicle forward/rearward acceleration.

Although, in the preferred embodiment, the microcomputer is appled as the braking pressure controlling unit 16, electronic discrete circuits may be combined to function as the microcomputer.

As described hereinabove, since according to the present invention the braking force controlling system and method which independently controls the braking force of the right and left braking means in accordance with either less value of the final target braking force value of the first target braking force to match the motion target value of the vehicle with the motion value generated actually on the vehicle or the second target braking force for the vehicular slip into the predetermined condition, the braking characteristic is not varied, the vehicular tire wheel being not locked, the reduction of the cornering characteristic can be avoided, and the steering ability can be improved. Consequently, the transient braking characteristic can be improved.

Suppose that the motion target value is the yaw rate, the braking force of the braking means according to the first target braking force which satisfies the yaw rate is controlled so that the cornering characteristic can be improved.

Furthermore, if the motion target value is that of the lateral direction, the braking force of the braking means which satisfies the first target braking force is controlled so that the cornering performance can be improved.

Finally, if the vehicular forward/rearward velocity is estimated from the tire wheel speed detection value, such a sensor as to detect the vehicular forward/rearward speed is not required and the structure can be compact. The various effects as described above can be achieved according to the present invention.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A braking system for an automotive vehicle having a front wheel pair, a rear wheel pair, and a steering wheel, said braking system comprising:
   a) means for detecting an angular displacement of said steering wheel and for producing a first signal indicative of said angular displacement;
   b) means for detecting a forward and rearward speed of said vehicle and for producing a second signal indicative of said speed;
   c) means, responsive to said first and second signals, for setting a target value of a preselected variable corresponding to a desired vehicular motion;
   d) right and left braking means, disposed on at least one of said front or rear wheel pairs;
   e) means for calculating a first target braking force for each of said right and left braking means independently, said first target braking forces being calculated so as to achieve said target value of a preselected variable corresponding to a desired vehicular motion;
   f) means for detecting a wheel speed of at least one of the wheels on which one of said left and right braking means is disposed, and for producing a third signal indicative of said wheel speed;
   g) means for calculating a second target braking force for at least one of said right and left braking means in response to said third signal, said second target braking force being calculated so as to maintain within a predetermined range the slip rate of the wheel whose speed has been detected; and
   h) means for independently controlling the braking force applied to each of said braking means in accordance with the lesser of the first target braking force or second target braking force corresponding to the particular braking means being controlled.

2. A braking system according to claim 1, wherein said means for detecting a forward and rearward speed of said vehicle estimates the vehicular forward and rearward speed on the basis of a wheel speed detection value indicated by the third signal derived from said means for detecting wheel speed.

3. A braking system according to claim 1, wherein said preselected variable corresponding to a desired vehicular motion is a yaw rate.

4. A braking system according to claim 3, wherein said preselected variable corresponding to a desired vehicular motion describes lateral motion of the vehicle.

5. A braking system according to claim 4, wherein said right and left braking means comprises right and left front wheel cylinders disposed on right and left front wheels, and right and left rear wheel cylinders disposed on right and left rear wheels, said braking means further comprising a first actuator for controlling the brake fluid pressure in each rear wheel cylinder, and a second actuator which in combination with said first actuator controls the brake fluid pressure in each front wheel cylinder.

6. A braking system according to claim 5, wherein said first actuator includes:
   first, second and third three-port, three-position solenoid-operated valve members, each of said valve members having an A port, a B port, and a P port, said valve members controlling brake fluid pressure in the wheel cylinders at levels below the brake fluid pressure of a master cylinder,
   P ports of the first and second solenoid-operated valve members being connected to a first hydraulic line emanating from the master cylinder,
   A ports of the first and second solenoid-operated valve members being connected to said second actuator,
   and B ports thereof of the first and second solenoid-operated valve members being connected to the second actuator by means of said first hydraulic line emanating from the master cylinder and a first hydraulic pressure pump which is driven by means of a motor,
   the P port of the third solenoid-operated valve member being connected to a second hydraulic line emanating from the master cylinder, the A port of the third solenoid-operated valve member being connected to the rear wheel cylinders, and the B port of the third solenoid-operated valve member being connected to the first hydraulic line by means of a hydraulic pump which is driven by means of a motor;
   a first accumulator connected to a conduit communicated between the P ports of the first and second solenoid-operated valve members and said first hydraulic pump;
   a first reservoir tank connected to a conduit between the B ports of the first and second solenoid-operated valve members and said first hydraulic pump;
   a second accumulator connected to a conduit communicated between the P port of said third solenoid-operated valve member and said second hydraulic pump; and,
   a second reservoir tank connected to a conduit between the B port of said third solenoid-operated valve member and the second hydraulic pump.

7. A braking system according to claim 6, wherein said second actuator includes:
   fourth and fifth solenoid-operated valve members which are disposed between said first actuator and said front wheel cylinders and which supply brake fluid under pressure to the front wheel cylinders; and
   sixth and seventh three-port, three-position solenoid-operated valve members, each of said valve members having an A port, a B port and a P port, said sixth and seventh valve members controlling the brake fluid pressures in the front wheel cylinders above the brake fluid pressure of the master cylinder,
   a third hydraulic pump disposed between each of said P ports and B ports by means of conduit;
   a third reservoir disposed between said third hydraulic pump and said P ports by means of conduit; and
   first and second plunger-type pistons, said first piston being disposed between an A port of one of said sixth or seventh valve members and said fourth valve member, said second piston being disposed between an A port of the other of said sixth or seventh valve members and said fifth valve member, said pistons each having a rod which Operates in reciprocating fashion to open and close one of said fourth and fifth valve members according to predetermined pressure thresholds so that an output from said first actuator can be cut-off and brake fluid pressure supplied from said third reservoir by means of said third hydraulic pump and through said sixth and seventh valve members to said wheel cylinders.

8. A braking system for an automotive vehicle having a front wheel pair, a rear wheel pair, and a steering wheel, said braking system comprising:

a) means for detecting an angular displacement of said steering wheel and for producing a first signal indicative of said angular displacement;

b) means for detecting a forward or rearward speed of said vehicle and for producing a second signal indicative of said speed;

c) means, responsive to said first and second signals, for setting a target value of a preselected variable corresponding to a desired vehicular motion, said preselected variable corresponding to a yaw rate in a lateral direction;

d) right and left braking means, disposed on at least one of said front or rear wheel pairs, said right and left braking means comprising right and left front wheel cylinders disposed on right and left front wheels, and right and left rear wheel cylinders disposed on right and left rear wheels, said braking means further comprising a first actuator for controlling the brake fluid pressure in each rear wheel cylinder, and a second actuator which in combination with said first actuator controls the brake fluid pressure in each front wheel cylinder, wherein said first actuator includes:

first, second and third three-port, three-position solenoid-operated valve members, each of said valve members having an A port, a B port, and a P port, said valve members controlling brake fluid pressure in the wheel cylinders at levels below the brake fluid pressure of a master cylinder, P ports of the first and second solenoid-operated valve members being connected to a first hydraulic line emanating from the master cylinder, A ports of the first and second solenoid-operated valve members being connected to said second actuator, and B ports of the first and second solenoid-operated valve members being connected to the second actuator by means of said first hydraulic line emanating from the master cylinder and a first hydraulic pressure pump which is driven by means of a motor, the P port of the third solenoid-operated valve member being connected to a second hydraulic line emanating from the master cylinder, the A port of the third solenoid-operated valve member being connected to the rear wheel cylinders, and the B port of the third solenoid-operated valve member being connected to the first hydraulic line by means of a hydraulic pump which is driven by means of a motor;

a first accumulator connected to a conduit communicated between the P ports of the first and second solenoid-operated valve members and said first hydraulic pump;

a first reservoir tank connected to a conduit between the B ports of the first and second solenoid-operated valve members and said first hydraulic pump;

a second accumulator connected to a conduit communicated between the P port of said third solenoid-operated valve member and said second hydraulic pump; and, a second reservoir tank connected to a conduit between the B port of said third solenoid-operated valve member and the second hydraulic pump;

and wherein said second actuator includes:

fourth and fifth solenoid-operated valve members which are disposed between said first actuator and said front wheel cylinders and which supply brake fluid under pressure to the front wheel cylinders; and sixth and seventh three-port, three-position solenoid-operated valve members, each of said valve members having an A port, a B port and a P port, said sixth and seventh valve members controlling the brake fluid pressures in the front wheel cylinders above the brake fluid pressure of the master cylinder, a third hydraulic Dump disposed between each of said P ports and B ports by means of conduit;

a third reservoir disposed between said third hydraulic pump and said P ports by means of conduit; and first and second plunger-type pistons, said first piston being disposed between an A port of one of said sixth or seventh valve members and said fourth valve member, said second piston being disposed between an A port of the other of said sixth or seventh valve members and said fifth valve member, said pistons each having a rod which operates in reciprocating fashion to open and close one of said fourth and fifth valve members according to predetermined pressure thresholds so that an output from said first actuator can be cut-off and brake fluid pressure supplied from said third reservoir by means of said third hydraulic pump and through said sixth and seventh valve members to said wheel cylinders;

e) means for calculating a first target braking force for each of said right and left braking means independently, said first target braking forces being calculated so as to achieve in combination said target value of a preselected variable corresponding to a desired vehicular motion;

f) means for detecting a wheel speed of at least one of the wheels on which one of said left and right braking means is disposed, and for producing a third signal indicative of said wheel speed;

g) means for calculating a second target braking force for at least one of said right and left braking means in response to said third signal, said second target braking force being calculated so as to maintain within a predetermined range the slip rate of the wheel whose speed has been detected; and h) means for independently controlling the braking force applied to each of said braking means in accordance with the lesser of the first target braking force or second target braking force corresponding to the particular braking means being controlled;

wherein said means for setting a target value of a preselected motion variable sets the target value of the vehicular motion as follows:

$$\Psi'r(n)=\Psi'r(n-1)+\Psi''r(n)*\Delta T$$

wherein $\Psi'r(n)$ denotes the target yaw rate, $\Psi'r(n-1)$ denotes a previous value of the target yaw rate, $\Psi''r(n)$ denotes a differential value of the target yaw rate, and $\Delta T$ denotes a timer interrupt period of time; and $\Psi''r(n)$ is calculated as follows:

$\Psi''r(n) = \tau^{-1}H_0 - \tau^{-1}\Psi'r(n-1)$ wherein $H_0 = (L*N)^{-1}V_x/(1+A*V_x^2)$ and L denotes a wheel base, A denotes a stability factor, $H_0$ denotes a steady-state yaw rate gain, $V_x$ denotes the value of the second signal of said means for detecting a forward or rearward speed of said vehicle, N denotes a steering gear ratio, and Θ denotes the steering angle, and wherein said means for setting a target value of a preselected motion variable sets the target value of the lateral direction speed as follows:

$Vyr(n) = Vyr(n-1) + V'yr(n)\Delta T$ wherein $V'yr(n) = a_{21}\Psi'r(n) + a_{22}Vry(n-1) + b_2\theta$ and wherein $a_{21}v/Vx - Vx$, $a_{21}v = -2(K_f*L_f - K_r*L_f)/M$, $a_{22} = a_{22}v = -2(K_f + K_r)/M$, $K_f$ denoting a front wheel cornering power, $K_r$ denoting a rear wheel cornering power, $b_2 = 2 K_f/(M*N)$, and M denotes a vehicular weight.

9. A braking system according to claim 8, wherein said means for calculating a first target braking force calculates the first target braking force for the left front wheel cylinder $P^*_{1FL}$, the first target braking force for the right wheel cylinder $P^*_{1FR}$, and the first target braking force for the rear wheel cylinder $P^*_{1R}$ as follows:

$P^*_{1FL} = max \{P_{MCF} + \Delta P/2, \Delta P, 0\}$ $P^*_{1FR} = max \{P_{MCF} - \Delta P/2, \Delta P, 0\}$ $P^*_{1R} = P_{MCR}$, wherein $\Delta P = \Delta Bf/k_p$,
$\Delta Bf = \{\tau''r(n) - a_{11}r(t) - a_{12}Vyr(t) - b_1\theta(t)\}/b_{p1}$, wherein $\Delta Bf$ denotes a braking force difference between the right and left wheels, and $k_p$ denotes a proportional constant between the wheel cylinder pressure and braking force.

10. A braking system according to claim 9, wherein said means for calculating a second target braking force calculates the second target braking force of the braking means required for the slip on the wheel related to the means for detecting a wheel speed to fall within a predetermined condition as follows:

$s = (V_x - V_w)/V_x \cdot 100$, wherein s denotes a slip rate, $V_w$ denotes the tire wheel revolution speed indicated by the third signal of said means for detecting a wheel speed; $V^*_w(t) = 0.8 \cdot V_x(t)$, wherein $V'^*W$ denotes a target tire wheel deceleration, $V'^*_w(t) = V'^*_{wo}(t)$, wherein $V'^*_{wo}(t)$ denotes a predetermined value of a tire wheel deceleration:

$P^*_{2FL}(t) = K_1 \cdot (V_{WFL}(t) - V^*_W(t)) + K_2 \cdot (V'_{WFL}(t) - V'^*_W(t))$ $P^*_{2FL}(t) = K_1 \cdot (V_{WFL}(t) - V^*_{WFL}(t) - F^*_W(t))$ $P^*_{2FR}(t) = K_1 \cdot (V_{WFR}(t) - V^*_W(t)) + K_2 (V'_{WFR}(t) - V'^*_W(t))$ $P^*_{2R}(t) = K_1 \cdot (V_{WR}(t) - V^*_W(t)) + K_2 - V'^*_W(t))$, wherein $K_1$ and $K_2$ denote predetermined weight coefficients, $P'^*_{2FL}(t)$, $P'^*_{2FR}(t)$, and $P'^*_{2R}(t)$ denote target wheel cylinder pressure change rates for the respective front and rear wheels per unit time, and $V'^*_{WFL}(t)$, $V'^*_{WFR}(t)$, and $V'^*_{WR}(t)$ denote differential values of the vehicle wheel revolution speeds indicated by the third signals of the means for detecting a wheel speed; and $P^*_{2FL}(t) = max[O, P^*_{1FL}(t) + \int_{to}^{t}P'^*_{2FL}(t)dt]$ $P^*_{2FR}(t) = max[O, P^*_{1FR}(t) + \int_{to}^{t}P'^*_{2FR}(t)dt]$ $P^*_{2R}(t) = max [O, P^*_{1R}(t) + \int_{to}^{t}P'^*_{2R}(t)dt] \, max \, [), P_{MCR} + \int_{to}^{t}P'^*_{2R}(t)dt]$, wherein $P^*_{2FL}(t)$, $P^*_{2FL}(t)$, and $P^*_{2FL}(t)$ denote the second target wheel cylinder pressures of the respective front and rear wheels.

11. A braking system according to claim 10, wherein said means for independently controlling the braking force applied to each of said braking means derives the target wheel cylinder pressures for the respective front and rear wheels as follows:

$P^*_{FL}(t) = \min \{P^*_{1FL}(t), P^*_{2FL}(t)\}$ $P^*_{FR}(t) = \min \{P^*_{1FR}(t), P^*_{2FR}(t)\}$ $P^*_R(t) = \min \{P^*_{1R}(t), P^*_{2R}(t)\} = \{P_{MCR}(t), P^*_{2R}(t)\}$, wherein $P^*_{FL}(t)$, $P^*_{FR}(t)$, and $P^*_R(t)$ denote the final target wheel cylinder pressures for the front left, front right, and rear wheels, $P_{MCF}$ denotes a master cylinder pressure for each front wheel and $P_{MCR}$ denotes a master cylinder pressure for each rear wheel.

12. A braking system according to claim 11, wherein said means for detecting a wheel speed includes a plurality of wheel speed sensors disposed on the front left and front right wheels and on one of the rear wheels for outputting the third signals ($V_{WFL}$, $V_{WFR}$, and $V_{WR}$) according to the corresponding wheel speeds.

13. A braking system according to claim 12, wherein the predetermined condition of said slip rate s is substantially 20%.

14. A braking system according to claim 13, which further includes a brake switch linked to a manually operable brake element for determining whether the manually operable brake element is operated and wherein said means for independently controlling braking force independently controls the individual braking forces of said left and right braking means through said first and second actuators so as to become coincident with a final target braking force which is either one of the first target braking force or second target braking force.

15. A method for controlling a braking force applied to each wheel of an automotive vehicle having a front wheel pair, a rear wheel pair, and a steering wheel, said method comprising the steps of:
 a) detecting an angular displacement of said steering wheel and producing a first signal indicative of said angular displacement;
 b) detecting a forward and rearward speed of said vehicle and producing a second signal indicative of said speed;
 c) setting a target value of a preselected variable corresponding to a desired vehicular motion in response to the first and second signals produced in steps a) and b);

d) calculating a first target braking force for each of said right and left braking means independently, said first target braking forces being calculated so as to achieve in combination said target value of a preselected variable corresponding to a desired vehicular motion;

e) detecting a wheel speed of at least one of the wheels on which one of said left and right braking means is disposed, and for producing a third signal indicative of said wheel speed;

f) calculating a second target braking force for at least one of said right and left braking means in response to said third signal, said second target braking force being calculated so as to maintain the slip rate of the wheel whose speed has been detected within a predetermined range; and h) independently controlling the braking force applied to each of said braking means in accordance with the lesser of the first target braking force or second target braking force corresponding to the particular braking means being controlled.

* * * * *